(12) United States Patent
Krishnan et al.

(10) Patent No.: US 12,314,347 B2
(45) Date of Patent: May 27, 2025

(54) METHOD AND SYSTEM OF RETRIEVING MULTIMODAL ASSETS

(71) Applicant: Microsoft Technology Licensing, LLC, Redmond, WA (US)

(72) Inventors: Adit Krishnan, Mountain View, CA (US); Ji Li, San Jose, CA (US); Amit Srivastava, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 456 days.

(21) Appl. No.: 17/703,552

(22) Filed: Mar. 24, 2022

(65) Prior Publication Data
US 2023/0306087 A1    Sep. 28, 2023

(51) Int. Cl.
*G06F 18/25*   (2023.01)
*G06F 16/2455*   (2019.01)
(Continued)

(52) U.S. Cl.
CPC ...... *G06F 18/256* (2023.01); *G06F 16/24556* (2019.01); *G06F 16/24578* (2019.01); *G06F 16/248* (2019.01); *G06F 16/9032* (2019.01); *G06F 16/9038* (2019.01); *G06F 18/21355* (2023.01); *G06F 18/24147* (2023.01); *G06N 20/00* (2019.01)

(58) Field of Classification Search
None
See application file for complete search history.

(56) References Cited

U.S. PATENT DOCUMENTS

| 8,250,613 B2 | 8/2012 | Faulkner et al. |
| 10,782,456 B2 | 9/2020 | Schürmann |

(Continued)

FOREIGN PATENT DOCUMENTS

| EP | 3794836 A1 | 3/2021 |
| WO | 2020051249 A1 | 3/2020 |

OTHER PUBLICATIONS

"Non Final Office Action Issued in U.S. Appl. No. 17/538,880", Mailed Date: Jun. 13, 2023, 15 Pages.
(Continued)

*Primary Examiner* — Yu Zhao
(74) *Attorney, Agent, or Firm* — NovoTechIP International PLLC

(57) ABSTRACT

A system and method and for retrieving one or more one or more multimodal assets includes receiving a search query for searching for one or more multimodal assets from among a plurality of candidate multimodal assets, encoding the search query into one or more query embedding representations via a trained query representation machine-learning (ML) model, comparing, via a matching unit, the one or more query embedding representations to a plurality of multimodal tensor representations, each of the plurality of multimodal tensor representations being a representation of one of the plurality of candidate multimodal assets, and identifying, based on the comparison, at least one of the plurality of the candidate multimodal assets as a search result for the search query, and providing the at least one of the plurality of the candidate multimodal assets for display as the search result.

21 Claims, 15 Drawing Sheets

(51) Int. Cl.
*G06F 16/2457* (2019.01)
*G06F 16/248* (2019.01)
*G06F 16/9032* (2019.01)
*G06F 16/9038* (2019.01)
*G06F 18/2135* (2023.01)
*G06F 18/2413* (2023.01)
*G06N 20/00* (2019.01)

(56) References Cited

U.S. PATENT DOCUMENTS

| | | |
|---|---|---|
| 10,783,456 B2 | 9/2020 | Strope et al. |
| 11,003,856 B2 | 5/2021 | Kiros et al. |
| 11,416,534 B2 | 8/2022 | Wang |
| 11,533,495 B2 | 12/2022 | Jain et al. |
| 11,620,331 B2 * | 4/2023 | Kislyuk ............... G06F 16/248 707/728 |
| 11,768,837 B1 | 9/2023 | Newman |
| 2005/0257240 A1 | 11/2005 | Faulkner et al. |
| 2011/0047226 A1 | 2/2011 | Gabriel et al. |
| 2011/0307425 A1 | 12/2011 | Wang et al. |
| 2013/0166543 A1 | 6/2013 | MacDonald et al. |
| 2013/0166587 A1 | 6/2013 | Berry |
| 2015/0034357 A1 | 2/2015 | Dower et al. |
| 2015/0067541 A1 | 3/2015 | Owens et al. |
| 2015/0278226 A1 | 10/2015 | Franks |
| 2015/0347357 A1 | 12/2015 | Maughan et al. |
| 2016/0042050 A1 | 2/2016 | Chen et al. |
| 2016/0092447 A1 | 3/2016 | Venkataraman et al. |
| 2017/0006357 A1 | 1/2017 | Obara |
| 2017/0098283 A1 | 4/2017 | Rajan et al. |
| 2017/0337265 A1 | 11/2017 | Garrett et al. |
| 2018/0068023 A1 * | 3/2018 | Douze ............... G06F 16/9535 |
| 2018/0113888 A1 | 4/2018 | Peña Muñoz |
| 2019/0007755 A1 | 1/2019 | Obara |
| 2019/0065492 A1 * | 2/2019 | Cheng ............... G06F 16/435 |
| 2019/0102397 A1 | 4/2019 | Hornkvist |
| 2019/0163766 A1 | 5/2019 | Gulati |
| 2019/0258713 A1 | 8/2019 | Kiros et al. |
| 2019/0258722 A1 | 8/2019 | Guo et al. |
| 2019/0303402 A1 | 10/2019 | Berry |
| 2019/0347556 A1 | 11/2019 | Yim et al. |
| 2020/0413154 A1 | 12/2020 | Obara |
| 2021/0133264 A1 | 5/2021 | Tiwari |
| 2021/0191925 A1 | 6/2021 | Sianez |
| 2021/0264203 A1 | 8/2021 | Fuxman et al. |
| 2021/0295822 A1 | 9/2021 | Tomkins |
| 2022/0075961 A1 | 3/2022 | Cavallari |
| 2022/0138170 A1 | 5/2022 | Misiewicz |
| 2022/0156298 A1 * | 5/2022 | Mahmoud ............ G06F 16/9535 |
| 2022/0245706 A1 | 8/2022 | Chaidaroon et al. |
| 2023/0169110 A1 | 6/2023 | Li et al. |
| 2023/0244727 A1 | 8/2023 | Liu |
| 2023/0325391 A1 | 10/2023 | Li et al. |
| 2024/0248901 A1 | 7/2024 | Krishnan |

OTHER PUBLICATIONS

Final Office Action mailed on Jan. 8, 2024, in U.S. Appl. No. 17/716,653, 28 pages.

U.S. Appl. No. 18/158,121, filed Jan. 23, 2023.

Non-Final Office Action mailed on May 21, 2024, in U.S. Appl. No. 17/716,653, 38 pages.

Notice of Allowance mailed on Mar. 18, 2024, in U.S. Appl. No. 17/538,880, 10 pages.

Hassan, et al., "Multi-Modal Information Integration for Document Retrieval", In Proceedings of 12th International Conference On Document Analysis And Recognition, Aug. 25, 2013, pp. 1200-1204.

"International Search Report and Written Opinion Issued in PCT Application No. PCT/US23/010536", Mailed Date: Apr. 26, 2023, 10 Pages.

Chi, et al., "Zero-Shot Cross-Media Embedding Learning With Dual Adversarial Distribution Network", In Journal of IEEE Transactions on Circuits and Systems for Video Technology, vol. 30, Issue 4, Apr. 3, 2020, pp. 1173-1187.

Lin, et al., "Learning Cross-Aligned Latent Embeddings for Zero-Shot Cross-Modal Retrieval", In Proceedings of the AAAI Conference on Artificial Intelligence, vol. 34, Issue 7, Feb. 7, 2020, pp. 11515-11522.

"International Search Report and Written Opinion Issued in PCT Application No. PCT/US23/011566", Mailed Date: May 25, 2023, 10 Pages.

"Non Final Office Action Issued in U.S. Appl. No. 17/716,653", Mailed Date: Jul. 14, 2023, 21 Pages.

Final Office Action mailed on Nov. 9, 2023, in U.S. Appl. No. 17/538,880, 13 pages.

"Application as Filed in U.S. Appl. No. 17/538,880", Filed Date: Nov. 30, 2021, 41 Pages U.S. Appl. No. 17/716,653, filed Apr. 8, 2022.

Non-Final Office Action mailed on Jul. 24, 2024, in U.S. Appl. No. 18/158,121, 74 pages.

Notice of Allowance mailed on Sep. 30, 2024, in U.S. Appl. No. 17/716,653, 10 pages.

Notice of Allowance mailed on Feb. 12, 2025, in U.S. Appl. No. 18/158,121, 15 pages.

* cited by examiner

METHOD AND SYSTEM OF RETRIEVING MULTIMODAL ASSETS

BACKGROUND

It is common for users of digital devices to search for digital content for a variety of reasons. For example, users may search for content that they can use in creating their own documents. Searching for text content can often be conducted quickly and efficiently. However, in addition to text, there are many types of visual content and/or multimodal content that include two or more different types of content. For example, many digitally designed documents such as cards, posters, design templates and the like include multiple different types of content (e.g., text, images, GIFs., icons, illustrations, etc.). Searching for and retrieving a desired multimodal content is, however, a complex and challenging task, and current search and retrieval mechanisms are not able to take into different types of content present in one multimodal document when searching for such content.

Moreover, training machine-learning (ML) models that can search for and identify content, is often difficult, as the number of content available for recommendations can be large and new content may be added on a regular basis. Furthermore, there are often restrictions on use of user-collected data for training such ML models. Still further, because of the large number of available content, manually annotating a data set may become too expensive. Moreover, the resulting trained ML models may become too large to deploy and operate. For example, such trained ML models may require significant memory space to store and operate. Furthermore, currently available search mechanisms for retrieval content often rely on a text query to initiate a search. While this is helpful if the user is able formulate an appropriate text query for the search, it does not provide the flexibility and accuracy of searching for like content based on similar content.

Hence, there is a need for improved systems and methods of locating and retrieving multimodal content.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving a search query for searching for one or more multimodal assets from among a plurality of candidate multimodal assets, encoding the search query into one or more query embedding representations via a trained representation ML model, comparing, via a matching unit, the one or more query embedding representations to a plurality of multimodal tensor representations, each of the plurality of multimodal tensor representations being a representation of one of the plurality of candidate multimodal assets, and identifying, based on the comparison, at least one of the plurality of the candidate multimodal assets as a search result for the search query, and providing the at least one of the plurality of the candidate multimodal assets for display as the search result.

In yet another general aspect, the instant disclosure presents a method for retrieving one or more multimodal assets. In some implementations, the method includes receiving a search query for searching for one or more multimodal assets from among a plurality of candidate multimodal assets, encoding the search query into one or more query embedding representations via a trained representation ML model, comparing, via a matching unit, the one or more query embedding representations to a plurality of multimodal tensor representations, each of the plurality of multimodal tensor representations being a representation of one of the plurality of candidate multimodal assets, and identifying, based on the comparison, at least one of the plurality of the candidate multimodal assets as a search result for the search query, and providing the at least one of the plurality of the candidate multimodal assets for display as the search result.

In a further general aspect, the instant application describes a non-transitory computer readable medium on which are stored instructions that when executed cause a programmable device to perform function of receiving a search query for searching for one or more multimodal assets from among a plurality of candidate multimodal assets, encoding the search query into one or more query embedding representations via a trained representation ML model, comparing, via a matching unit, the one or more query embedding representations to a plurality of multimodal tensor representations, each of the plurality of multimodal tensor representations being a representation of one of the plurality of candidate multimodal assets, and identifying, based on the comparison, at least one of the plurality of the candidate multimodal assets as a search result for the search query, and providing the at least one of the plurality of the candidate multimodal assets for display as the search result.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
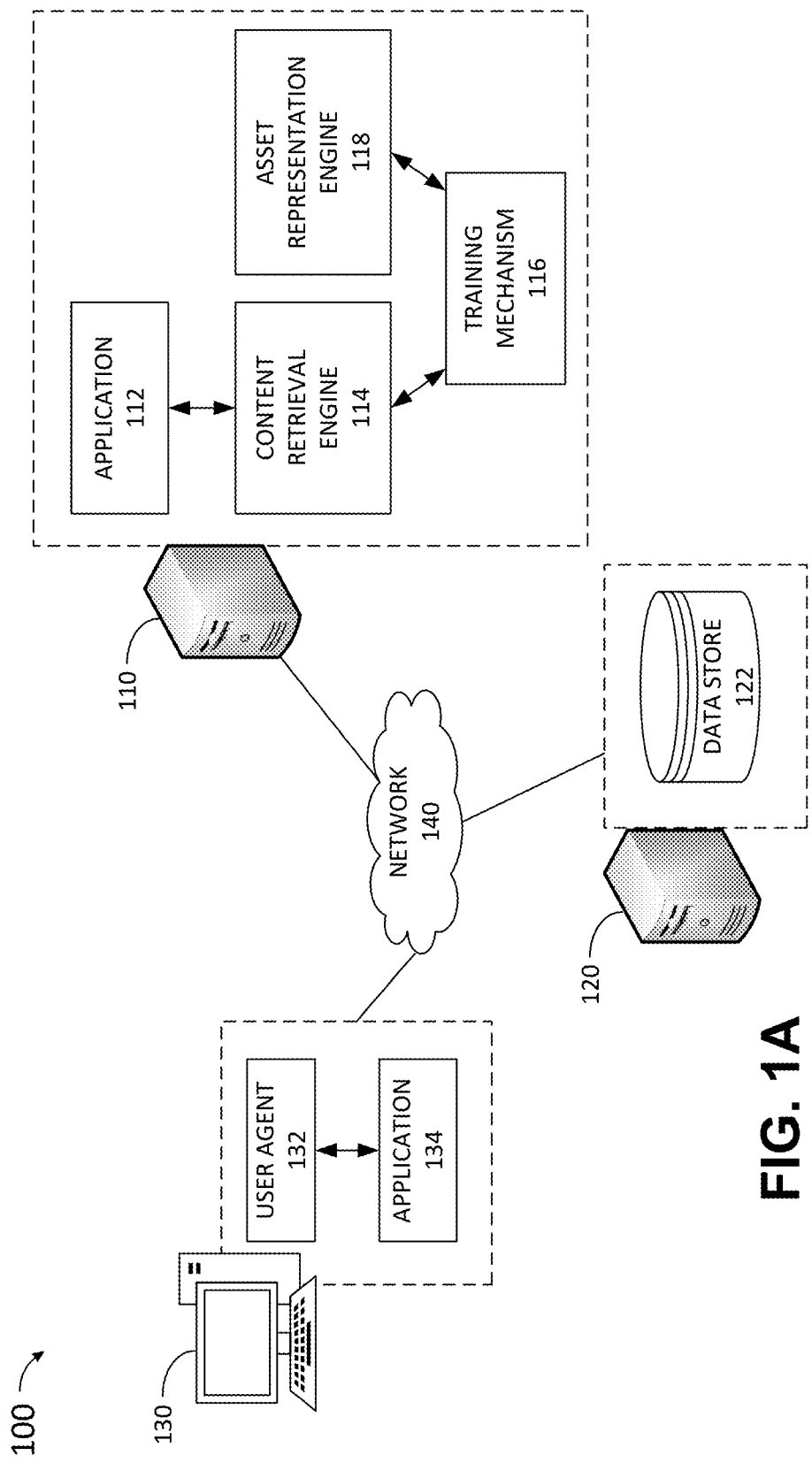
FIG. 1A depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Many currently used software applications enable users to search for content and/offer content recommendations to users in order to assist the users create a document and/or improve the quality of a document they are working on. To make the document more aesthetically pleasing or interesting, the user may choose to add visual content to the document. Some applications enable a user to use templates to create a desired document. For example, some documents such as flyers, invitations and the like may be developed by using pre-made templates. A template may include many different types of content. For example, a template for a birthday invitation card often includes text, as well as images, Graphical Interchange Formats (GIFs), icons, and illustrations. Other templates may include videos, emoticons, vector graphics, and/or any combination of these contents.

Searching for multimodal content, however, is a complex process, as most current search systems rely on text queries to conduct a search. However, many multimodal documents do not contain textual content or textual descriptions. Even if a multimodal document contains text, the text may not be representative of all the different types of content present in the document, and as such may not provide reliable search results. Furthermore, currently available mechanisms for searching for content often include separate search systems for each type of content. These systems do not share the underlying technology and hence cannot benefit from improvements in each other. Furthermore, the use of separate search systems often leads to the need for additional memory, processing and bandwidth. Still further, these systems are unable to search for different types of content within one document. Thus, there exists a technical problem of lack of adequate mechanisms for conducting a search for multimodal content using a cohesive searching system that provides a uniform searching experience.

New multimodal content is often being regularly added to content databases. Currently used models for searching for content often require that new content be labeled before it can be added to the content databases for searching. This requires significant cost and labor. Moreover, after new content is added, because of lack of user feedback for the new content, the models often struggle to recommend them as search results. Thus, there exists another technical problem of lack of mechanisms for efficiently adding new multimodal content to content databases and providing the new content in search results.

To address these technical problems and more, in an example, this description provides technical solutions for intelligently locating and retrieving multimodal assets from one or more asset libraries. This may be achieved by utilizing a content retrieval engine that enables searching for and retrieving multimodal content such as pre-designed templates as well as searching for different types of visual assets. This may involve use of a multimodal tensor-to-tensor ranking framework that eliminates the need for model retraining and/or human annotation to incorporate new multimodal content. The multimodal tensor-to-tensor ranking framework may rely on shared computational steps to obtain tensor and/or summary embeddings for new content. The use of the multimodal framework provides a mechanism for adding new content to asset libraries in a zero-shot manner that does not require labeling and can be performed quickly and efficiently. Searching via the content retrieval engine may be provided by one or more applications that offer searching via text and/or other types of queries. For example, search queries may include providing one or more types of input content as query. The input content may be an image, an icon, a text, an illustration, a template, or any combination of these types of inputs. The search features may be provided via a user interface (UI) screen that enables the user to perform a search and view search results and/or provides content recommendations for inserting into or utilizing in creation of a document. In this manner, the technical solution provides a searching and retrieval system for multimodal assets that can search for multimodal content in an efficient and accurate manner, provides an efficient mechanism for adding new assets, is user friendly and provides highly accurate results.

The technical solution described herein addresses the technical problem of inadequate, inefficient and/or inaccurate mechanisms for searching for multimodal content and achieves technical effects by providing a system and method for intelligently locating and retrieving multimodal assets from one or more asset libraries. The technical solution allows a user to navigate quickly and efficiently search for, access and review search results of relevant multimodal and/or different types of content, and therefore improves graphical user interfaces for electronic devices. The technical effects at least include (1) improving the efficiency of using an electronic device to search for multimodal content using text or other types of input data; (2) improving the efficiency of searching for content in asset libraries containing a significantly large number of assets by providing a two-stage ranking solution that quickly reduces the candidate asset space in an order of magnitudes (e.g., from millions of assets to thousands in a few milliseconds); (3) improving the efficiency of adding new content to asset libraries by providing a mechanism for adding new content in a zero-shot manner that does not require labeling and can be performed quickly and efficiently; and (4) increasing relevancy of search results displayed to the user by using a multimodal tensor-to-tensor ranking framework.

As will be understood by persons of skill in the art upon reading this disclosure, benefits and advantages provided by such implementations can include, but are not limited to, a technical solution to the technical problems of lack of mechanisms for efficient and user-friendly searching of multimodal assets. Technical solutions and implementations provided herein offer a mechanism for vectorizing multimodal content using different representation models, and then searching the vectorized assets using one or more types of search queries. The benefits made available by these technology-based solutions provide a user-friendly mechanism for searching for multimodal and/or different types of assets, reduced memory, processing and bandwidth requirements for storing and running the searching systems and reduced costs associated with updating the asset libraries and search models.

As used herein, the terms "multimodal content," "multimodal document" or "multimodal asset" may refer to an electronic document that includes different types of content. The different types of content include texts, images, videos, GIFs, icons, emoticons, vector graphics, illustrations and the like. The term "content asset" or "asset" as used herein may refer to any type of electronic document that can be provided as a retrievable asset from a library. Examples of assets include images, videos, GIFs, icons, emoticons, vector graphics, illustrations and multimodal content. Furthermore, as used herein, the term "textual input" may refer to an input received via an input/output device of a computer device, where the input includes alphanumeric text or other characters. The term "search query" may refer to input data provided as a sample of a type of data for which a search should be conducted. The input data may include text, images, multimodal content, icons, videos, illustrations and the like.

FIG. 1A illustrates an example system 100, upon which aspects of this disclosure may be implemented. The system 100 may include a server 110, which may itself include an application 112, a content retrieval engine 114, an asset representation engine 118, and a training mechanism 116. While shown as one server, the server 110 may represent a plurality of servers that work together to deliver the functions and services provided by each engine or application included in the server 110. The server 110 may operate as a shared resource server located at an enterprise accessible by various computer client devices such as a client device 130. The server 110 may also operate as a cloud-based server for offering content retrieval services in one or more applications such as application 112 and/or application 134.

The server 110 may include and/or execute a content retrieval engine 114, which may receive a request for content from an application such as the application 112 or 134 and may process the request by identifying one or more assets that correspond with the request. The request may be an explicit search request submitted by a user via a UI associated with the application 112 or 134. Alternatively, the request may be transmitted automatically via the application 112 or 134 to provide automatic content recommendations to the user. For example, the application 112 or 134 may examine the content of a document a user is interacting with, determine based on the actions of the user and/or other parameters that the user is creating content, identify keywords, formatting and/or other features of the content, and create a search query for content based on some of the content of the document and/or contextual data. This may be done by utilizing one or more ML models that perform NLP and/or other functions to automatically create one or more search queries for a document and/or user. The search query may include textual input such as text keywords and/or other types of input. For example, the query may include one or more type of data from the document the user is working (e.g., image, icon, illustration, etc.).

The content retrieval engine 114 may include separate modules for processing the different types of queries. For example, the content retrieval engine 114 may include different modules from processing text queries, image queries, icon queries, and the like. Furthermore, the content retrieval engine 114 may include a separate element for comparing the processed query data with processed assets to identify one or more assets that correspond with the query. One or more modules and elements of the content retrieval engine 114 may include one or more ML models. The internal structure of and data flow between the various elements of the content retrieval engine 114 is discussed in greater detail with respect to FIG. 1C.

One or more ML models implemented by the content retrieval engine 114 and/or asset representation engine 118 may be trained by the training mechanism 116. The training mechanism 116 may use training data sets stored in the data store 122 to provide initial and ongoing training for each of the models. Alternatively, or additionally, the training mechanism 116 may use training data sets from elsewhere. In some implementations, the training mechanism 116 uses labeled training data to train one or more of the models via deep neural network(s) or other types of ML models. In other implementations, the training mechanism 116 uses unlabeled training data. The initial training may be performed in an offline stage. Additionally, and/or alternatively, the one or more ML models may be trained using batch learning.

As a general matter, the methods and systems described herein may include, or otherwise make use of one or more ML model to perform natural language processing (NPL), vectorize different types of data, analyze content and/or locate search results. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in different types of assets, determine associations between various words and objects, identify keywords and/or classify content. Such training may be made following the accumulation, review, and/or analysis of data over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

The asset representation engine 118 may operate to convert a content asset into a numerical dense vector embedding. In an example, the asset representation engine 118 can convert different types of assets including multimodal assets to vector embeddings. To achieve this, the asset representation engine 158 may make use of separate ML models for each type of asset. For example, the asset representation engine 158 may include an ML model for converting images to vector representations, another ML for converting icons to vector representations, yet another ML model for converting illustrations to vector representations. Further details regarding the operation of the asset representation engine is provided in greater detail with respect to FIG. 1B.

The system 100 may include a server 120 which may be connected to or include the data store 122 which may function as a repository in which databases relating to training models, asset libraries, and/or vectorized representations of assets may be stored. Although shown as a single data store, the data store 122 may be representative of multiple storage devices and data stores which may be accessible by one or more of the content retrieval engine 114, asset representation engine 118, training mechanism 1116, and application 112.

The client device 130 may be connected to the server 110 via a network 140. The network 140 may be a wired or wireless network(s) or a combination of wired and wireless networks that connect one or more elements of the system 100. The client device 130 may be a personal or handheld computing device having or being connected to input/output elements that enable a user to interact with various applications (e.g., application 112 or application 134). Examples of suitable client devices 130 include but are not limited to personal computers, desktop computers, laptop computers, mobile telephones; smart phones; tablets; phablets; smart watches; wearable computers; gaming devices/computers; televisions; and the like. The internal hardware structure of a client device is discussed in greater detail with respect to FIGS. 7 and 8.

The client device 130 may include a local application 134. The application 134 may be a computer program executed on the client device that configures the device to be responsive to user input to allow a user to interactively create, edit, and/or review a document. The application 134 may also enable the user to interactively submit a search query and receive search results and/or content recommendations. Examples of suitable applications include, but are not limited to, a word processing application, a presentation application, a note taking application, and communications application, and a design application.

In some examples, the application used to submit a search query and/or receive content recommendations is executed on the server 110 (e.g., application 112) and provided via an online service. In some implementations, web applications communicate via the network 140 with a user agent 132, such as a browser, executing on the client device 130. The user agent 132 may provide a user interface that allows the user to interact with the application 112. User data from the application 134 or application 112 may be provided via the network 140 to the content retrieval engine 114 for use in providing multimodal asset search results.

Figure 1B:
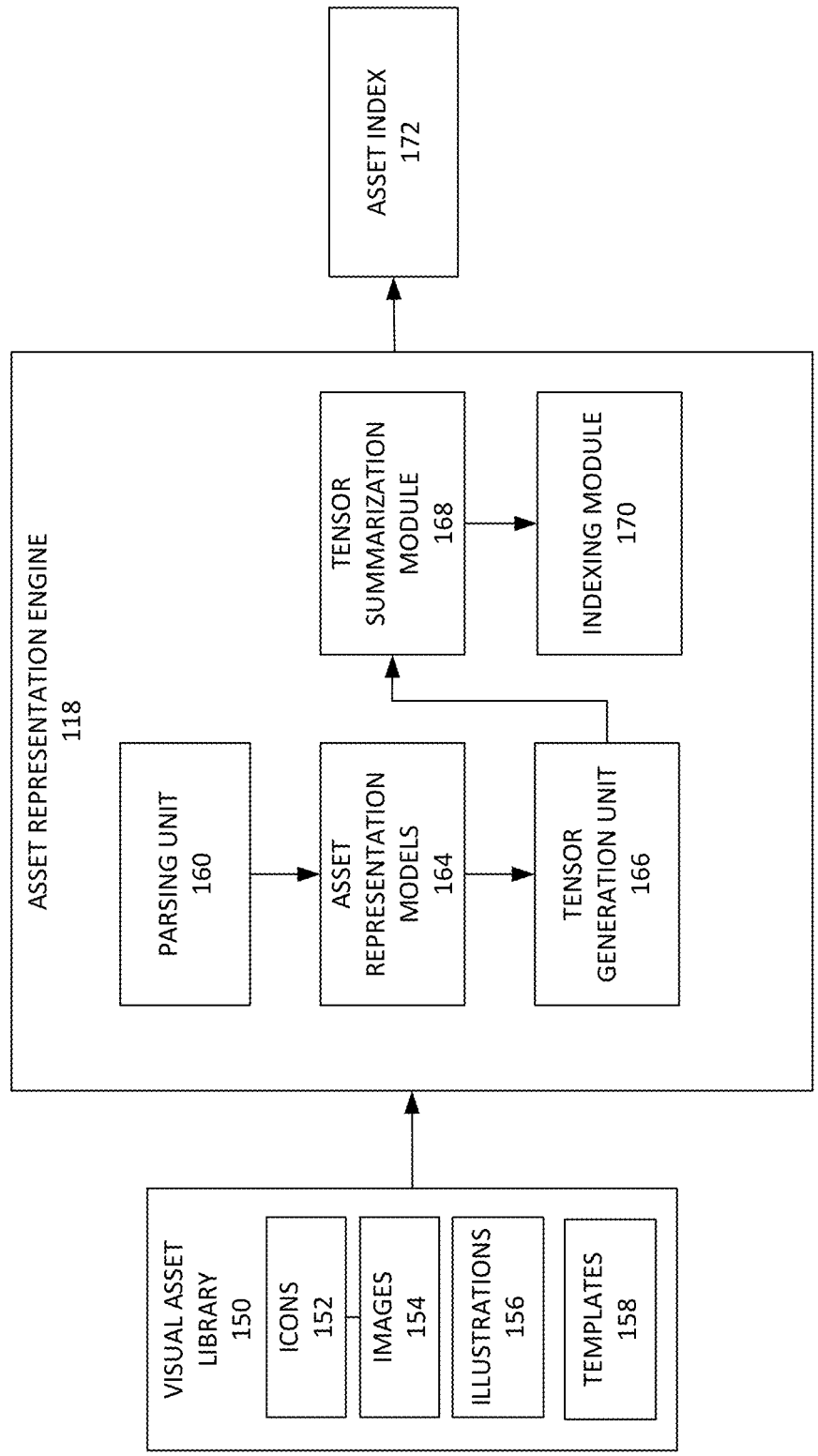
FIG. 1B depicts an example data flow between some elements of an example system upon which aspects of this disclosure may be implemented.

FIG. 1B depicts an example of some of the elements involved in generating asset representations. Assets in one or more visual asset libraries such as the visual asset library 150 may be supplied to the asset representation engine 118 such that they can be converted to asset index for efficient searching. The visual asset library 150 may be stored in a storage medium such as the storage server 120 of FIG. 1A (e.g., in data store 122). Alternatively, different portions of the visual asset library 150 may be stored in different storage mediums. The visual asset library 150 may include a vast library of visual assets (e.g., millions or thousands of visual assets), which may include many different types of visual assets. In an example, the visual asset library includes an icons library 152, an images library 154, an illustrations library 156, and a templates library 158. However, many other types of visual assets may be included in the visual asset library 150 (e.g., GIFs, illustrations, emoticons, etc.). Each of the icons' library 152, an images' library 154, an illustrations' library 156, and a templates' library 158 may include a large number of visual assets. The templates library 158 may include multimodal assets (e.g., templates) that each contain one or more different types of content (e.g., text, image, icons, illustrations, etc.).

The asset representation engine 118 may include a parsing unit 160 for parsing the content of multimodal assets into the different types of content that form the assets. For example, a template (e.g., birthday invitation digital card) containing two text portions (e.g., two phrases), an image and an illustration may be parsed into the different types of content. This may be achieved by utilizing one or more ML models that analyze the content of a document and identify and parse different types of content within the document. The parsed content may then be provided to asset representation models 164 for converting the content to vector representations. The asset representation models 164 may be trained representation models for converting different types of content into vector representations. In an example, the asset representation models 164 include a text representation model, an image representation model, an icon representation model and an illustration representation model. Many other different type of representation models may also be included to convert other types of content (e.g., videos, emoticons, GIFs, etc.) to vector representations.

The asset representation models 164 may process each of the asset libraries and/or parsed content to convert the constituent content to embedding vectors which may then be stored in a matrix/tensor format to facilitate matching and selection at runtime. In an example, the image representation model, icon representation model and/or illustration representation models of the visual asset representation model 164 are Shifted Window (SWIN) Transformers. As is known in the art, a SWIN transformer is a type of vision transformer that builds hierarchical feature maps by merging image patches in deeper layers. These models may convert the visual content of multimodal assets (e.g., visual content of templates 158) and/or visual assets (e.g., icons 152, images 154 and illustrations 158) to a multi-dimensional vector space (e.g., 256 dimensions) in the same vector space. The vector space may have the same number of dimensions as the vector space into which the search query is converted. Thus, each visual asset in the visual asset library 150 may be encoded into one or more vector embeddings.

The text representation model of the asset representation models 164 may be a trained ML model for encoding textual inputs into text vector embeddings. For example, the text representation model may convert text into vector embeddings in a vector space. In an example, each text segment is converted to a multi-dimensional vector space (e.g., 256 dimensions). In some implementations, the text representation model 150 incorporates the Turing text model. However, other text representation models may be used.

Once the content of the templates 158 and/or icons 152, images 154 and illustrations 158 are converted to vector representations, they may be transmitted to a tensor generation unit 166 to be turned into tensors. A tensor refers to a mathematical object that is used to describe a multilinear relationship between sets of mathematical objects such as objects related to a vector space. A tensor may be represented by an array of components that describe functions relevant to coordinates of a space. For example, a tensor can create a mapping between vectors or other tensors. A tensor can be defined by its order. A tensor of order one is a vector, while a tensor of order two is a matrix. Matrices can be used to represent characteristics of an object that is affected by multiple factors or forces. Tensors can be used in ML models by neural networks as components to describe and calculate phenomena. The technical solution makes use of tensor to represent characteristics of assets such as multimodal assets. In this manner, a multi-rank tensor can be used to represent the various elements present in a multimodal asset. For example, a multimodal tensor can be created for each template 158. The multimodal tensor may create mappings between various vector representations for each of the elements of the multimodal asset. For a multimodal asset having an image, an icon, multiple text segments, and an illustration (e.g., a template), the tensor generation unit 166 may use the vector representations for each of those elements to generate a tensor that results in a multimodal tensor representation for the asset. The multimodal tensor representation includes vector representations for each of the elements of the asset and provides the multilinear relationship between the different vector representations in the tensor. The multimodal tensor may include different rows for each modality (e.g., one row for text modality, one row for image modality, one row for icon modality, one row for illustration modality, etc.). In this manner, the multimodal tensor representation provides a mechanism for representing complex objects having multiple different elements in one mathematical object. The single multimodal tensor representation for each asset may then be compared with a tensor that represents the search query to determine similarities and identify search results. In some implementations, tensor generation occurs as part of generating vector representations for content and is performed by the asset representation models 164.

After tensors are generated, the tensors may be provided to a tensor summarization module 168 in order to increase the efficiency of the search and retrieval system. The tensor summarization module 168 may reduce the tensors to summary embedding representations that have a fixed size regardless of the number of elements in each tensor. The tensor summarization module 168 may achieve this by reducing non-uniform embeddings in each tensor to a uniform set of embeddings. This may involve creating one aggregate embedding for each of the different modalities in a tensor. For example, one aggregate embedding may be created for all the text content. Another one aggregate embedding may be generated for all the images and the like. This standardization enables the system to apply a class of techniques during the searching phase to select a smaller candidate set of visual assets from a large pool of visual assets, as discussed in more detail with respect to FIG. 1C. In an example, the class of techniques includes Approximate Nearest Neighbor (ANN) techniques.

The summarized tensor may be provided to an indexing module 170 for generating an asset index 172 for each visual asset. The indexing module 170 may be an ANN indexing module that utilizes ANN indexing techniques to index the template summary embeddings and convert them to pre-computed assets indexes 172. The asset indexes 172 may be transmitted to an asset index library for storage. It should be noted that ANN techniques are conventionally used to support single embeddings. However, the ANN techniques utilized in the technical solution support multiple embeddings within one tensor. By utilizing the indexing module 170, the asset representation engine 118 is able to reduce the memory, processing and bandwidth requirements for searching visual asset libraries containing a vast number of visual assets. This increases searching speed and increases the efficiency of computing systems used to search and retrieve visual assets.

The process of converting a visual asset to a vector embedding occurs once. Thus, when the asset representation models 164 are trained, it may process the visual asset library 150 to convert the visual assets to the asset indexes 172 This process may not need to be repeated in the future unless new visual assets are added to the visual asset library 150. When new assets are added to one of the icons' library 152, images' library 154, illustrations' library 156 and/or templates' library 158 or a new type of visual asset is added to the visual asset library 150, the new assets can be process in a zero-shot manner. This means that any new visual asset (e.g., new templates, images, videos, etc.) can be directly converted into encodings by applying the asset representation models 164 to the new asset. The encodings may then be added to the indexed asset library. Thus, adding new assets to the library does not require expensive labeling of assets. Furthermore, there is no need for updating, changing, or retraining the asset representation models 164, when new assets area added. Still further, the process of adding new assets is an inexpensive computational operation which can occur offline. By using the asset representation models 164 to convert visual assets into vector encodings, the visual asset library 150 can be easily scaled to millions of assets effortlessly since no human effort is involved. As such, by utilizing the asset representation models 164, the technical solution significantly improves the process of adding new assets to visual asset libraries and locating and retrieving a desired visual asset.

Figure 1C:
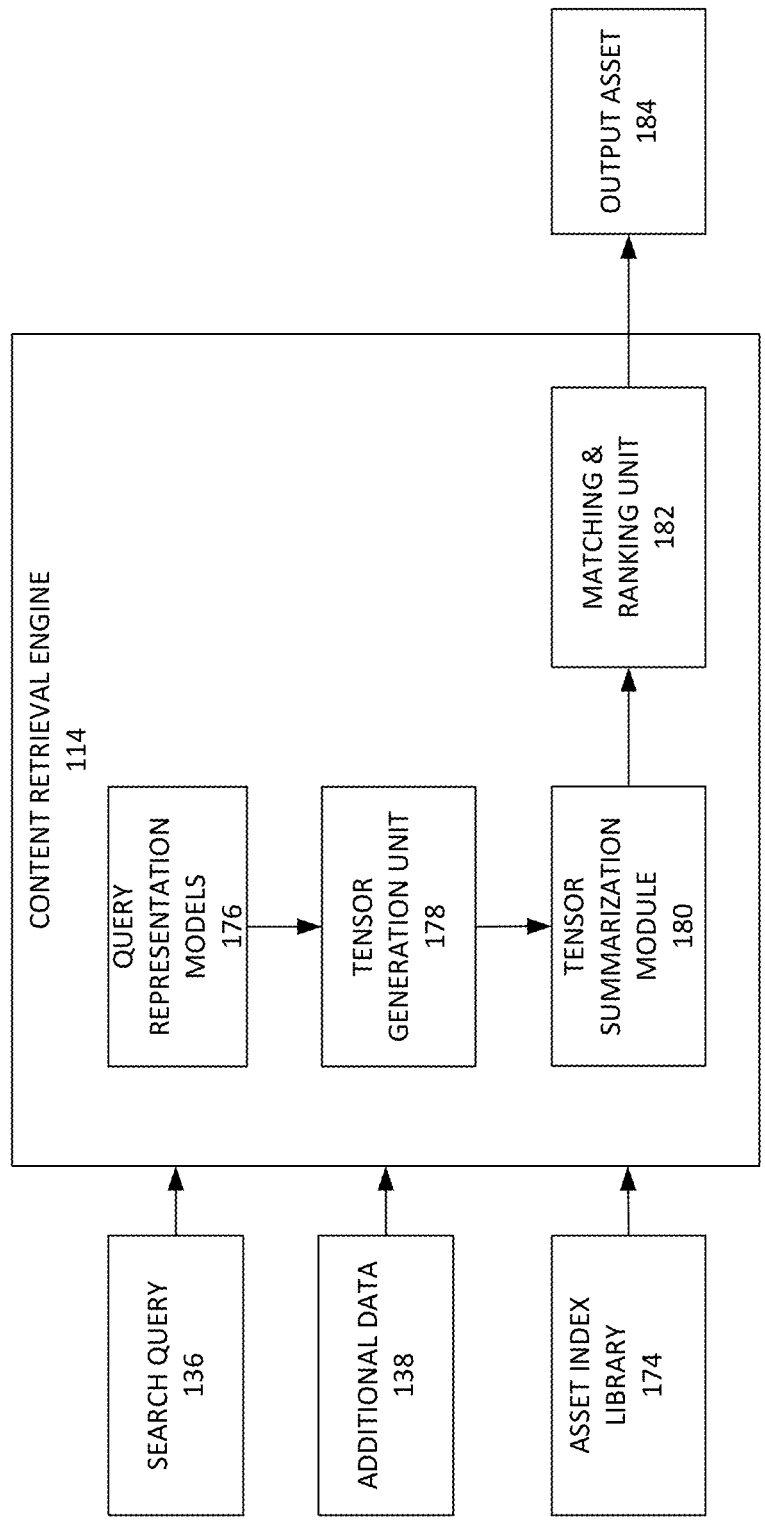
FIG. 1C depicts an example data flow between some elements of an example system upon which aspects of this disclosure may be implemented.

FIG. 1C depicts an example of data between some of the elements of the system 100. The content retrieval engine 114 may include a query representation unit 176, tensor representation unit 178, tensor summarization module 180 and matching and selection unit 182. A search query 136 may be received via an application that provides functionality for searching for and retrieving assets such as multimodal assets. As discussed above, the search query 136 may be submitted by a user (e.g., explicit search request) or it may be generated by the application (e.g., implicit search request). The search query 136 may include text that specifies parameters for the desired assets. For example, the search query 136 may include one or more keywords or phrases related to a topic the user is interested in (e.g., waterfalls, dogs playing, plants growing, etc.). Furthermore, the search query may include other types of content. For example, a search query may be submitted by utilizing an image, an icon, an illustration, and/or a multimodal document (e.g., a template). Thus, the user may submit a query to receive assets that are similar to an image. In another example, the user may be working on an incomplete template and decide to review similar templates. The content retrieval engine 114 enables such a user to submit the incomplete template as the search query. The incomplete template may be a multimodal document containing different types of content (e.g., text, images, icons, etc.).

In some implementations, the search query also includes the type of visual asset the user is interested in. For example, the search query 136 may include the phrase "videos of erupting volcanoes" or "templates for birthday invitations". To ensure such search queries are processed accurately, the application via which the search query 136 is submitted may preprocess the search query 136 by determining if the search query 136 contains keywords that indicate the search query includes a request for specific types of visual assets. In some implementations, preprocessing the search query 136 is done via one or more NLP algorithms. In some configurations, the preprocessing operations is performed by the content retrieval engine 114 or another element of the system. Once words or phrases related to the type of visual asset desired are identified, those words or phrases may be removed from the search query 136 before the search query 136 is transmitted. The request for particular types of visual asset may then be submitted as part of the additional data 138. In some implementations, even if the search query 136 itself does not include a request for specific types of data, the application via which the request is submitted may have specific requirements or restrictions. For example, the application may only be able to process (e.g., insert) certain types of visual assets into documents. In another example, the application may have quality and/or size restrictions for visual assets that can be utilized by the application. In yet another example, the application may have threshold requirements with respect to the likelihood of the visual asset being a match for the search query 136. For example, the application may specify that only visual assets that are more likely than a predetermined threshold (e.g., above 95%) to be a match for the search query 136 should be returned. These requirements and restrictions may be included in the additional data 138 which may be transmitted from the application to the content retrieval engine 114. In some implementations, the additional data 138 is included and/or transmitted with the search query 136.

The search query 136 may be received by the text representation model 176 for processing. The query representation model 176 may be a trained ML model for encoding different parts of the search query 136 into embeddings. To enable conversion of different types of inputs (e.g., text, image, template), the query representation model 176 may include a plurality of representation models, one for each type of query. For example, the query representation model 176 may include a text representation model and one or more visual representation models for different types of visual inputs (e.g., images, icons, illustrations, templates, etc.). To enable processing of multimodal input queries such as templates, the query representation model 176 may also include a parsing unit for parsing such multimodal inputs into the different types of content that make up the multimodal document. For example, when an incomplete template the user is working on is transmitted as the input query, the incomplete template may be parsed to identity text segments, images, icons, and the like within the template. Each of these types of content may then be transmitted to a corresponding representation model within the query representation model 176 to convert them to embeddings. In an example, each type of input query is converted to a multi-dimensional vector space (e.g., 256 dimensions). The query representation model 176 may encode the search query 136 in a similar manner as that of the asset representation models 164 such the query representations correspond to the embedding representations of the asset index library.

Once the search query 136 is converted to vector embeddings, the embeddings are transmitted to a tensor generation unit 178 for conversion into tensors. The tensor generation unit 178 may operate in a similar manner as the tensor generation unit 166 of the asset representation engine 118. For example, for multimodal input queries (e.g., templates), the tensor generation unit 166 may generate a multimodal tensor containing various vector embeddings that represent the content of the template. In some implementations, tensor generation occurs as part of generating vector representations for content and is performed by the query representation models 178. After one or more tensors are generated for the search query, the generated tensors may be transmitted to the tensor summarization module 180 to reduce the tensors to summary embedding representations that have a fixed size regardless of the number of elements in each tensor. The tensor summarization module 180 may operate in a similar manner as that of the tensor summarization module 166 to generate uniform set of embeddings. As a result, the summary asset embeddings and the query tensors may have the same fixed shape and fixed size summary embedding regardless of the number of elements in the asset and the search query, which may vary depending on the multimodal content and the type of search query (e.g., vary on a template by template and query by query basis).

Once one or more summarized tensors have been generated for the search query 136, the summarized tensors are transmitted to a matching and ranking unit 182. The matching and selection unit may also have access to an asset index library 174 that stores asset indexes 172. The asset library 174 may be stored in a storage medium such as the storage server 120 of FIG. 1A (e.g., in data store 122). Alternatively, different portions of the asset library 174 may be stored in different storage mediums. The asset library 174 may include indexes for a vast library of visual assets (e.g., millions of visual assets), which may include many different types of assets (e.g., templates, images, icons, illustrations, videos, etc.).

The matching and ranking unit 182 may compare the query tensors with the asset encodings of the asset index library 174 and retrieve visual assets that are similar to the query tensors. In some implementations, the matching and ranking unit 182 achieves in two steps. The first step involves leveraging scalable indexing to prune the set of candidate asset tensors for a given query tensor. This may be achieved by utilizing ANN embedding match techniques. The standardization of the summary tensors enables the use of ANN techniques to reduce the size of the original asset index library 174 by an order of magnitude (e.g., from millions to a few thousand candidates) to create a smaller candidate set for a given query.

The smaller candidate set may then be used to perform a higher resolution tensor-to-tensor matching. In some implementations, this involves comparing every element of the query tensor to each element of the candidate tensors to generate similarity scores between each element of the query and the candidate tensor. This may be done by using the cosine vector similarity metric to estimate the degree of similarity between a query tensor and candidate tensor on a −1 (highly irrelevant) to a +1 (highly relevant) scale. An aggregate similarity score may then be calculated based on the similarity scores of each two elements of the tensors. The candidate tensors may then be ranked according to their aggregate similarity scores. Some of the most highly ranked matches may then be selected as the search results. In some implementations, the matching and ranking unit 182 selects candidate assets whose similarity score exceeds a threshold similarity measure as the search results.

In some implementations, the matching and ranking unit 182 takes the additional data 138 into account to retrieve visual assets that satisfy the requirements of the additional data 138. For example, when the additional data 138 specifies only one type of asset for retrieval (e.g., templates), the matching and ranking unit 182 selects search results that are of the specified type. Thus, the matching and ranking unit 182 may treat the requirements set forth in the additional data 138 as tunable parameters that enable the matching and ranking unit 182 to dynamically select the underlying asset index to achieve the required composition of assets in the retrieved results. As such, the matching and ranking unit 182 may be a dynamic component that adapts to the client application requirements at runtime. Once the search results are filtered and selected, assets corresponding to the selected asset indexes may be retrieved from the visual asset library 150 and transmitted as the output asset 184 to the application that submitted the search query 136. In some implementations, a link to the selected assets is provided to the application which can in turn use the link to retrieve the output assets.

Figure 1D:
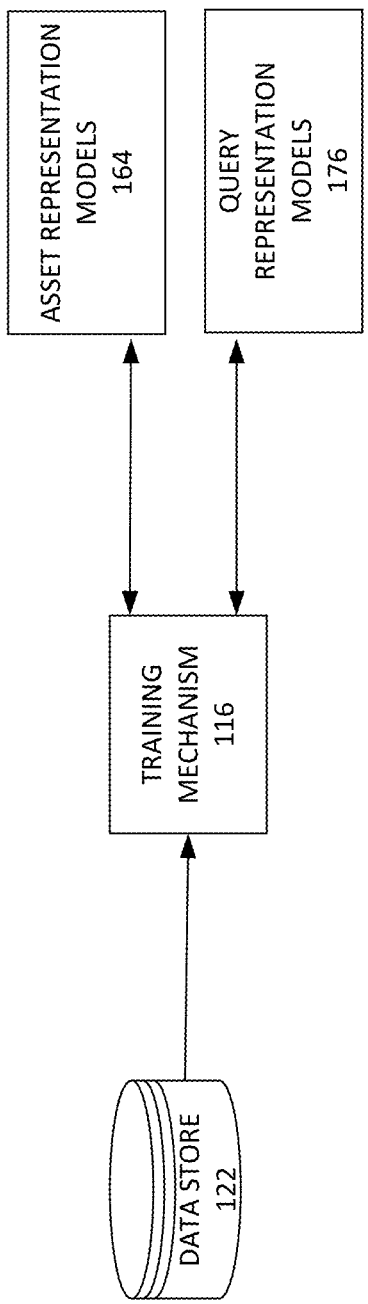
FIG. 1D how one or more ML models used by a content retrieval engine may be trained.

FIG. 1D depicts how one or more ML models used by the content retrieval engine 114 and asset representation engine 118 may be trained by using the training mechanism 116. The training mechanism 116 may use labeled training data sets stored in the data store 122 to provide initial training to the text representation model 150 and visual asset representation model 158. In some implementations, a training dataset which includes pairs of candidate assets and textual descriptions (e.g., one or more keywords or phrases for each type of content within the candidate asset) may be used to train the text representation model 150 and visual asset representation model 158 in conjunction with each other. For example, for a candidate template having images, text portions, icons, and illustrations, textual descriptions may be paired with teach of the images, text portions, icons, and illustrations within the template to train the models.

In some implementations, to provide ongoing training, the training mechanism 144 may use training data sets received from each of the ML models. Furthermore, data may be provided from the training mechanism 116 to the data store 122 to update one or more of the training datasets in order to provide updated and ongoing training. Additionally, the training mechanism 122 may receive training data such as knowledge from other pre-trained mechanisms. The models may be initially trained in an offline phase. Once the models are trained, ongoing training or adding of new candidate assets may be done in a zero-shot unsupervised manner that does not require labeling.

Figure 2:
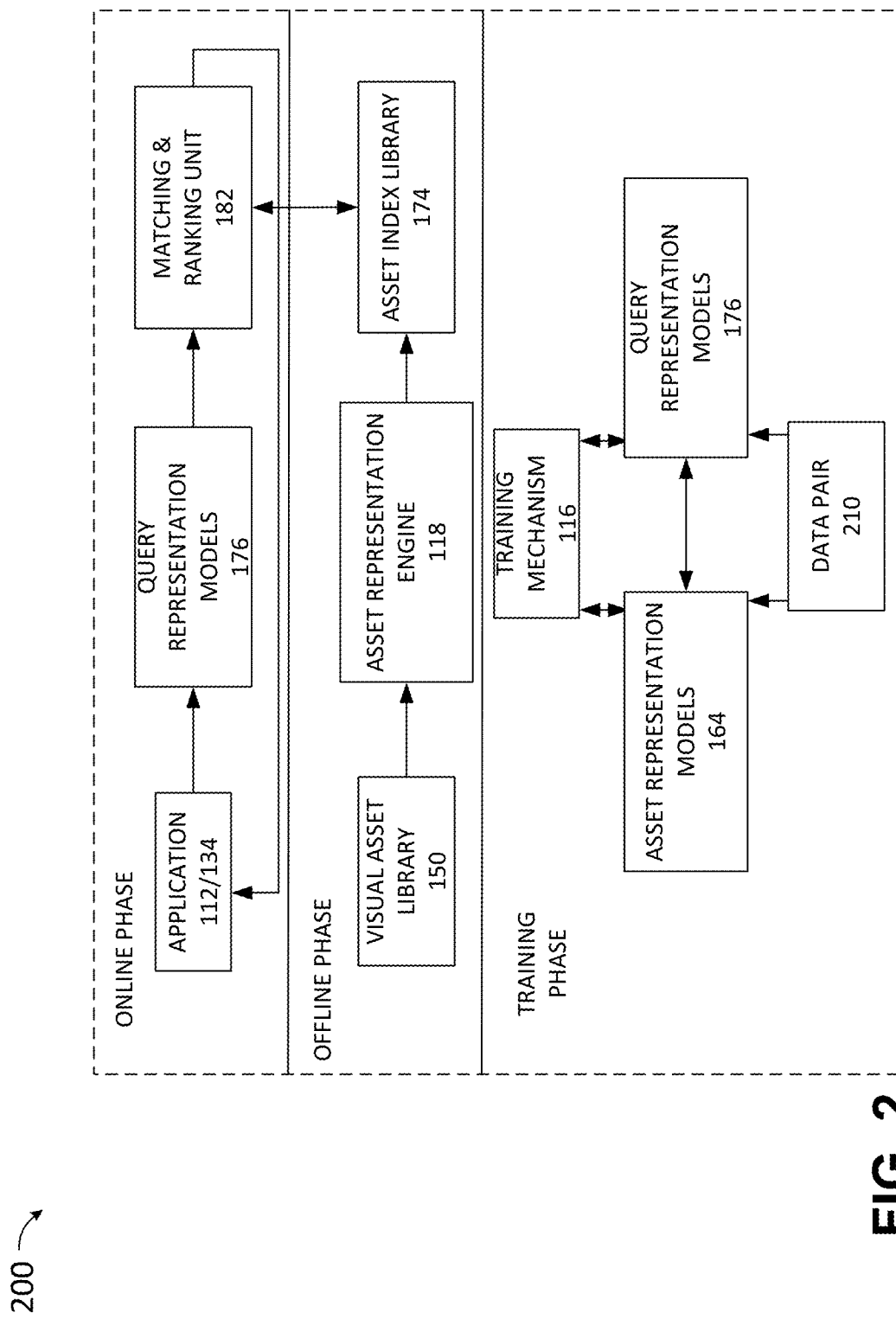
FIG. 2 depicts is an example model architecture for training and utilizing a visual content retrieval system.

FIG. 2 depicts is an example model architecture 200 for training and utilizing a content retrieval system. The model architecture 200 may include three phases: a training phase, an offline phase and an online phase. The training phase may involve training each of the asset representation models 164 and query representation models 176 with training data that includes data pairs 210. The data pairs 210 may include candidate assets that are aligned with text descriptions or phrases. For example, a picture of a parrot on a tree may be paired with the text "parrot in the wild." In an example, the asset representation models 164 and query representation models 176 are trained in conjunction with each other with a vast number (e.g., millions) of data pairs 210. The data pairs 210 may include diverse types of candidate assets to represent the asset libraries that are used for retrieval of visual assets in the online retrieval phase. This enables the asset representation models 164 to identify associations between visual objects and words and/or other types of objects or assets and learn how to encode candidate assets into vector embeddings that are similar to vector embeddings generated by the query representation models 176. Thus, during the training phase, the asset representation models 164 are trained to encode generic knowledge of semantic concepts, patterns and objects that commonly appear in candidate assets. Analogously, the query representation models 176 are trained to map concepts and tokens in input queries to the concepts of the asset training data.

The offline phase involves use of the trained asset representation models of the asset representation engine 118 to process each of the asset libraries in the asset library 150 to convert the constituent assets to embedding vectors, which are then stored in the asset index library 174. The online phase, on the other hand, includes receiving a search query from an application 112/134, and using the trained query representation models 176 to encode the input query into embedding representations that are provided to the matching and ranking unit 182. The matching and ranking unit 182 may then compare the query embeddings with the asset indexes generated by the asset representation models 164 to identify search results. As discussed above, this may involve first creating summary tensors for the query embeddings and the candidate assets.

The modular construction of model architecture 200, both in terms of separate computation and different phases of training, indexing and online usage, provides significant advantages for operating, analyzing, maintaining, and periodically updating the underlying models. For example, the matching and ranking unit 182 may be independently updated to incorporate new client application constraints. This can occur independent of the asset representation and query representation models, thus providing an efficient mechanism for maintaining and updating the system.

Figure 3A:
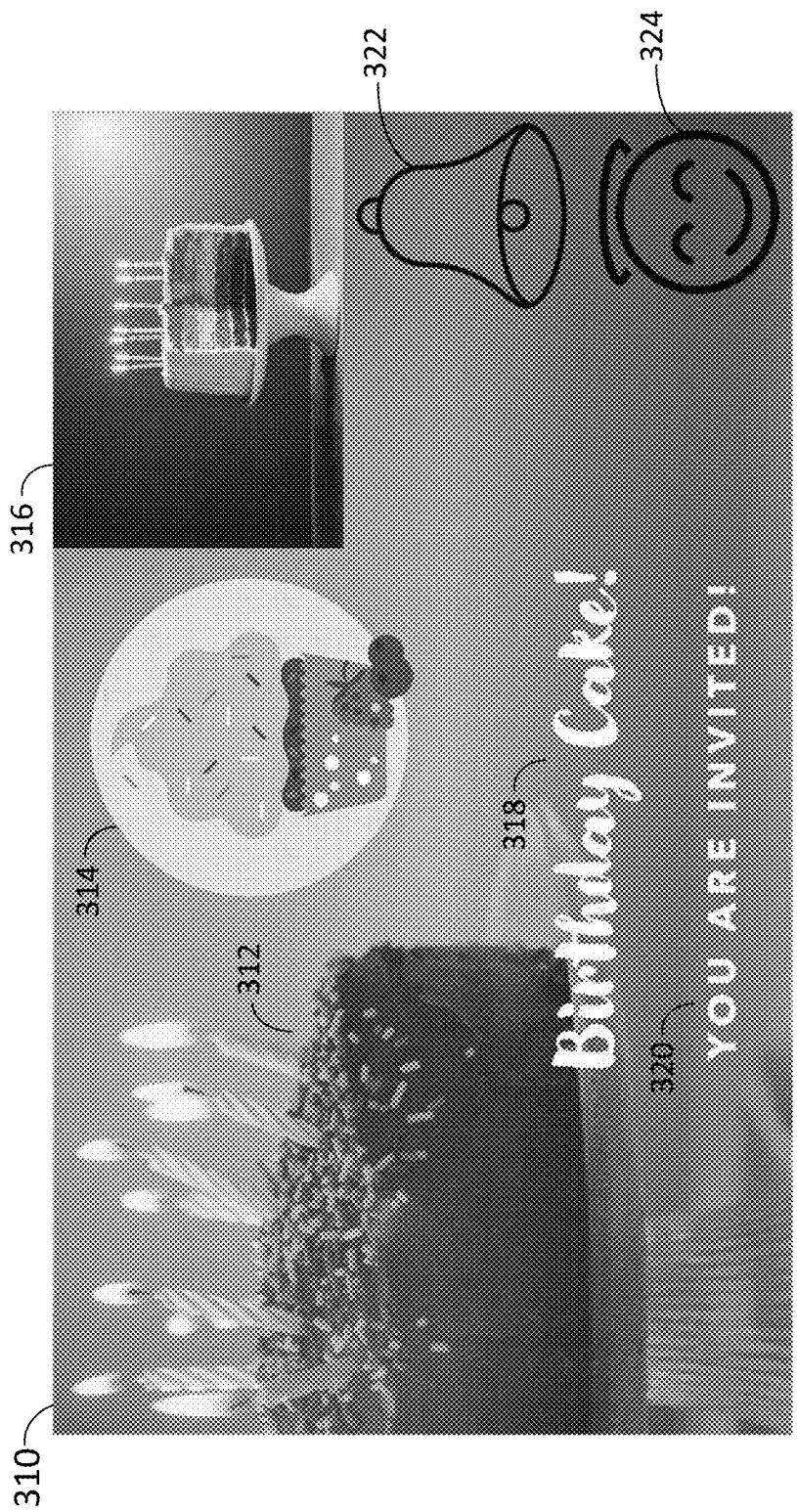
FIGS. 3A-3D depict an example process for converting a multimodal document into a multimodal tensor.

FIGS. 3A-3D depict an example process for converting a multimodal document into a multimodal tensor. FIG. 3A depicts an example multimodal document 310 having a variety of different types of content. The multimodal document may be an editable template that includes two different images 312 and 316, two text segments 318 and 320, an illustration 314 and two icons 322 and 324. It should be noted that the number and types of different content in the multimodal document 310 are exemplary. A multimodal document upon which aspects of this disclosure may be implemented may contain many different types and numbers of content.

Figure 3B:
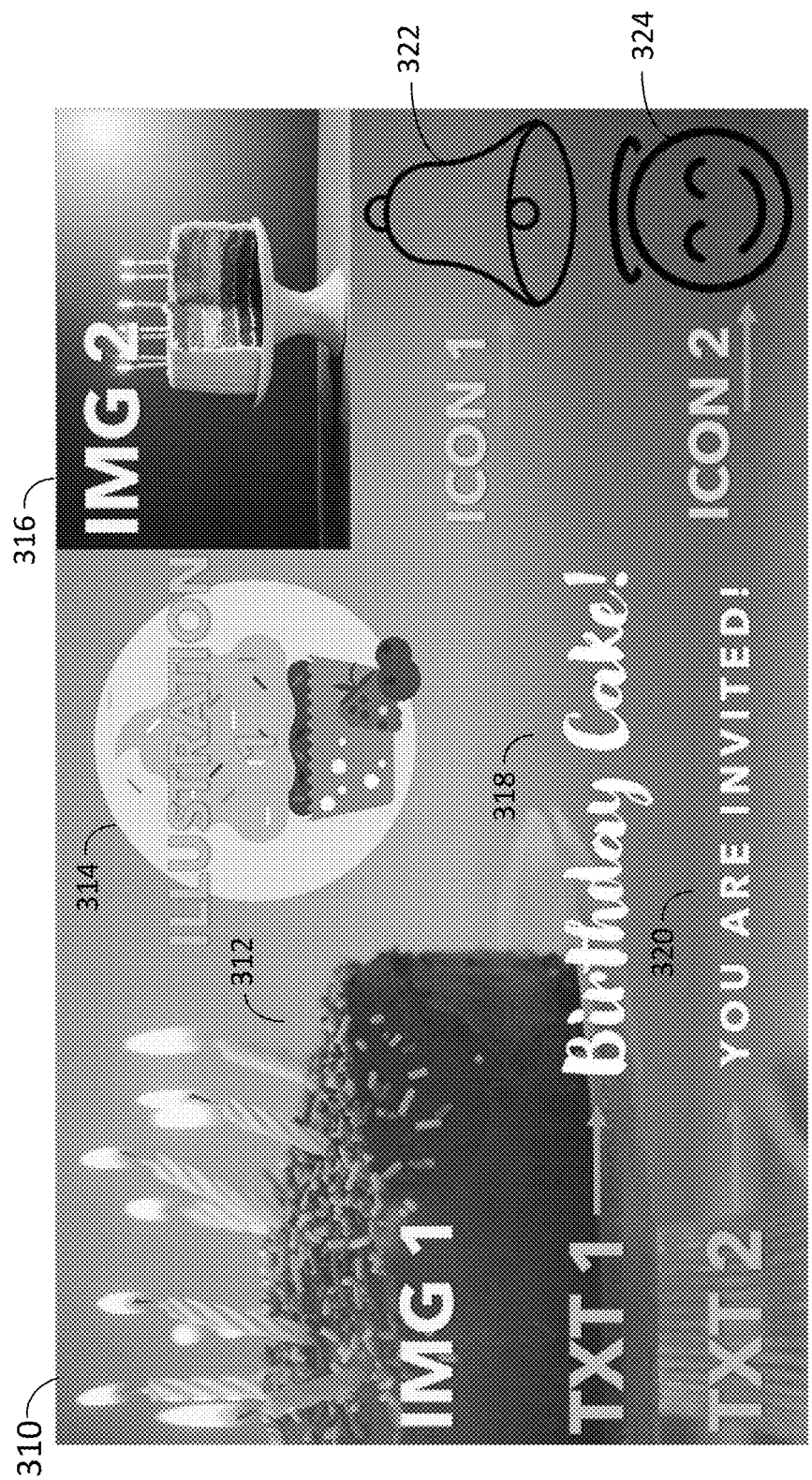

To process the multimodal document 310 as an asset, the different types of content may first be identified and/or parsed. FIG. 3B depicts how the different types of content in multimodal document 310 may be identified. For example, images 312 and 316 may be identified as images and designated as IMG 1 and IMG 2. Similarly, text segments 318 and 320 may be identified and designated as TXT 1 and TXT 2, while icons 322 and 324 are identified and designated as ICON 1 and ICON 2. Moreover, the illustration 314 may be identified and designated as ILLUSTRATION.

Figure 3C:
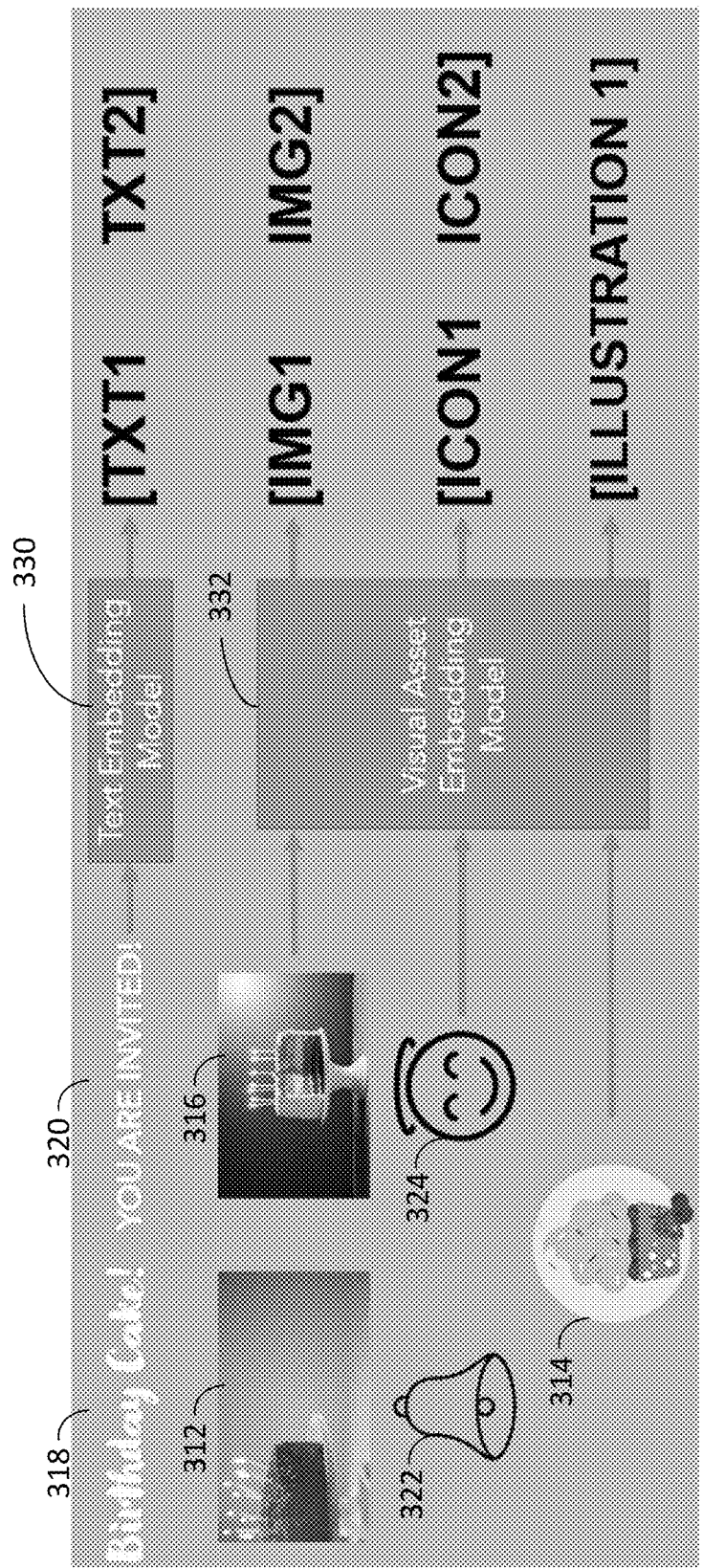
Figure 3D:
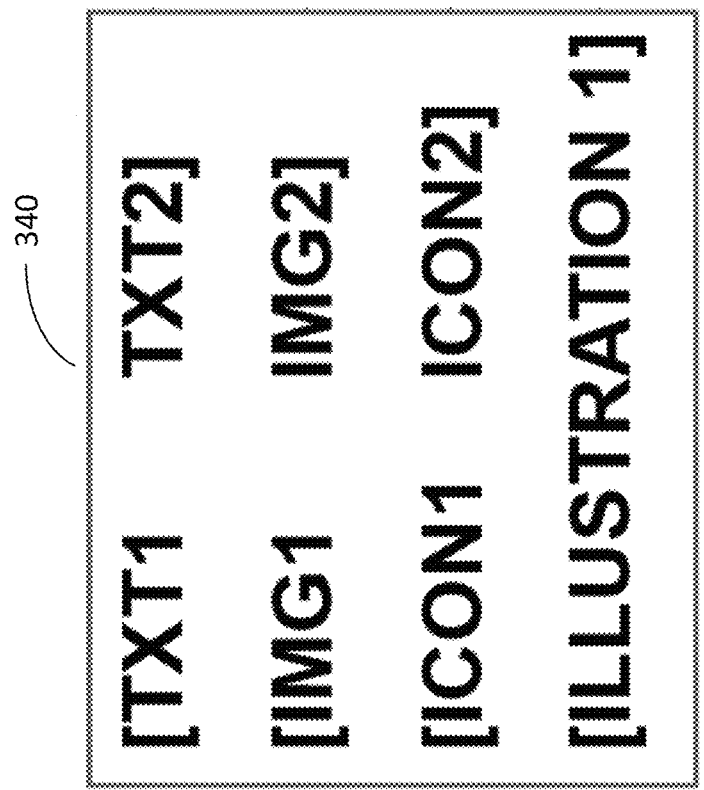

After the various contents have been identified and parsed, they may be provided to respective embedding models to generate vector representations for each identified content. This is depicted in FIG. 3C in which text segments 318 and 320 are transmitted to the text embedding model 330, while images 312 and 316, icons 322 and 324 and illustration 314 are provided to the visual asset embedding model 332. The visual asset embedding model 332 may be representative of multiple individual models (e.g., an image embedding model, an icons' embedding model and an illustrations' embedding model). The text embedding model 330 and visual asset embedding model 332 may convert each of the different contents (images 312 and 316, text segments 318 and 320, icons 322 and 324 and illustration 314) into vector representations. The different vector representations may be combined to generate a multimodal tensor, such as the tensor 340 illustrated in FIG. 3D. The multimodal tensor 340 may have a text modality for text vector representations, an image modality for the image vector representations, an icon modality for the icon vector representations and an illustration modality for the illustration vector representations.

Figure 4A:
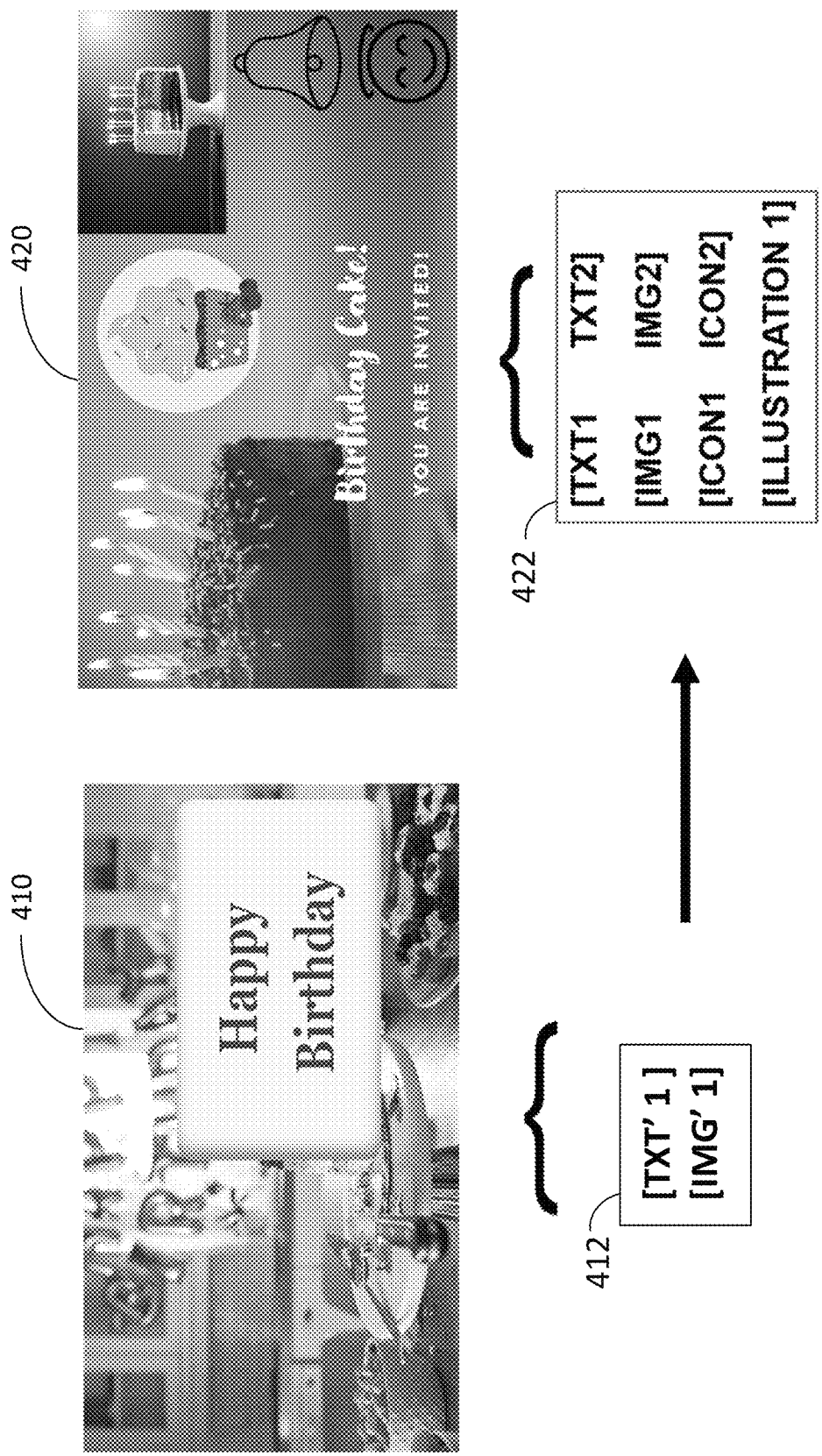
FIGS. 4A-4B depict example processes for conducting a search for multimodal documents based on an example search query.
Figure 4B:
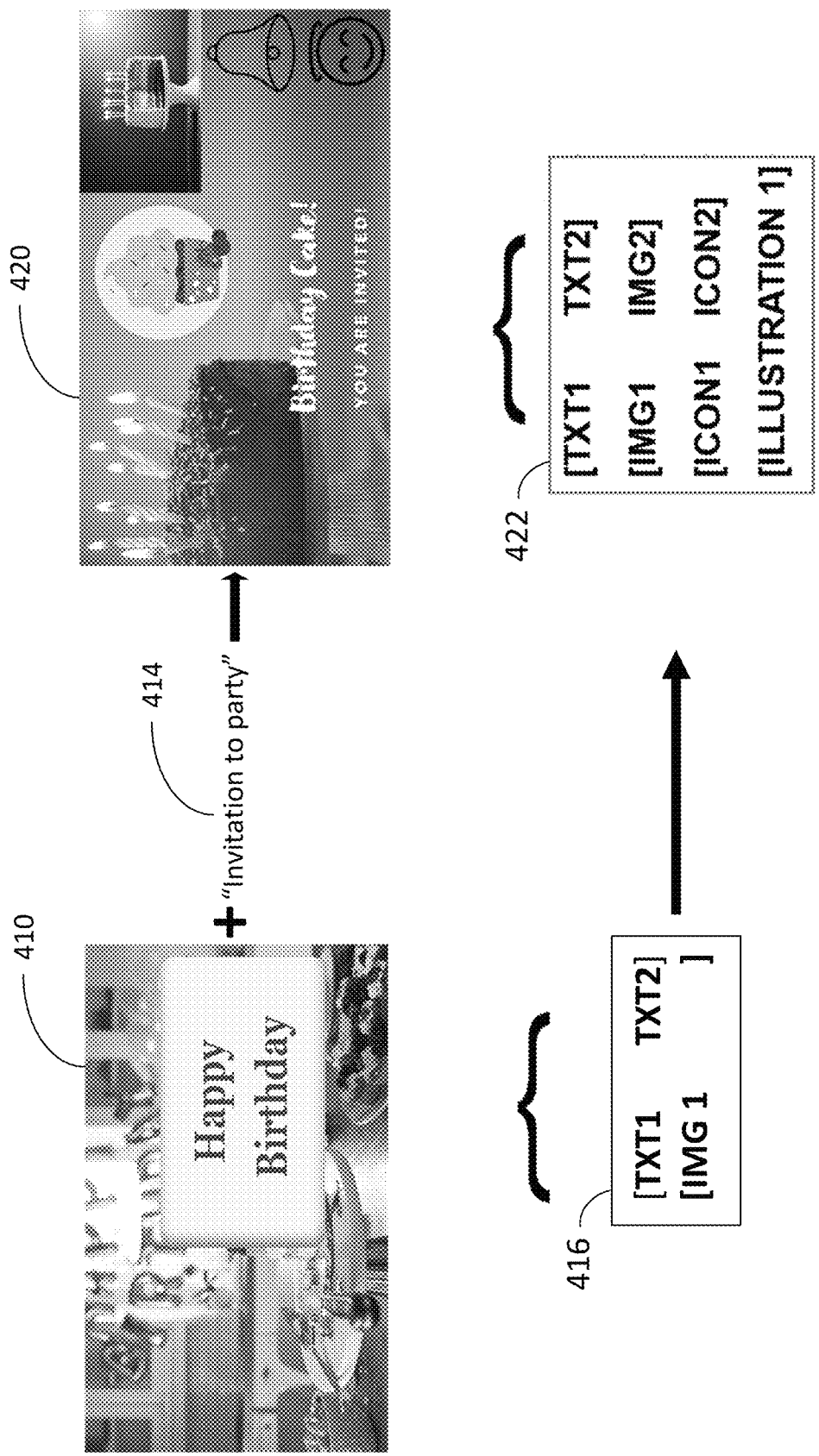

FIGS. 4A-4B depict example processes for conducting a search for multimodal documents based on an example search query. FIG. 4A depicts an example search query which contains a multimodal object 410. For example, a user may submit the multimodal object 410 as an input to search for similar documents. The multimodal object 410 may be a document containing a plurality of elements. The plurality of elements may include the same or different types of content (e.g., text, image, icon, illustration, etc.). Once the search request is submitted, the multimodal document 410 may be converted to the multimodal tensor 412 which converts the text segment and image in the multimodal document 410 to vector representations. The multimodal tensor 412 may be compared with multimodal tensors that have been generated for multimodal assets in an asset library, as discussed in detail above. As a result of the comparison, the multimodal document 420 having the multimodal tensor 422 may be identified as a search result, since both the text segment and the image in the multimodal document 410 contain elements that are similar to the text segments and images of the multimodal document 420.

FIG. 4B depicts an example search query which contains two types of data. The search query in FIG. 4B may include the multimodal document 410 as well as a text segment 414. For example, the user may submit both the multimodal document 410 and the text segment 414 as inputs for searching for multimodal documents. Once the search request is received, the multimodal document 410 and the text segment 414 may be converted to one multimodal tensor 416. The multimodal tensor 416 may be compared against multimodal tensors that have been generated for multimodal assets in an asset library, as discussed in detail above. As a result of the comparison, the multimodal document 422 having the multimodal tensor 422 may be identified as a search result, since the two text segments and the image in the multimodal tensor 416 contain elements that are similar to the text segments and images of the multimodal document 420.

Figure 5:
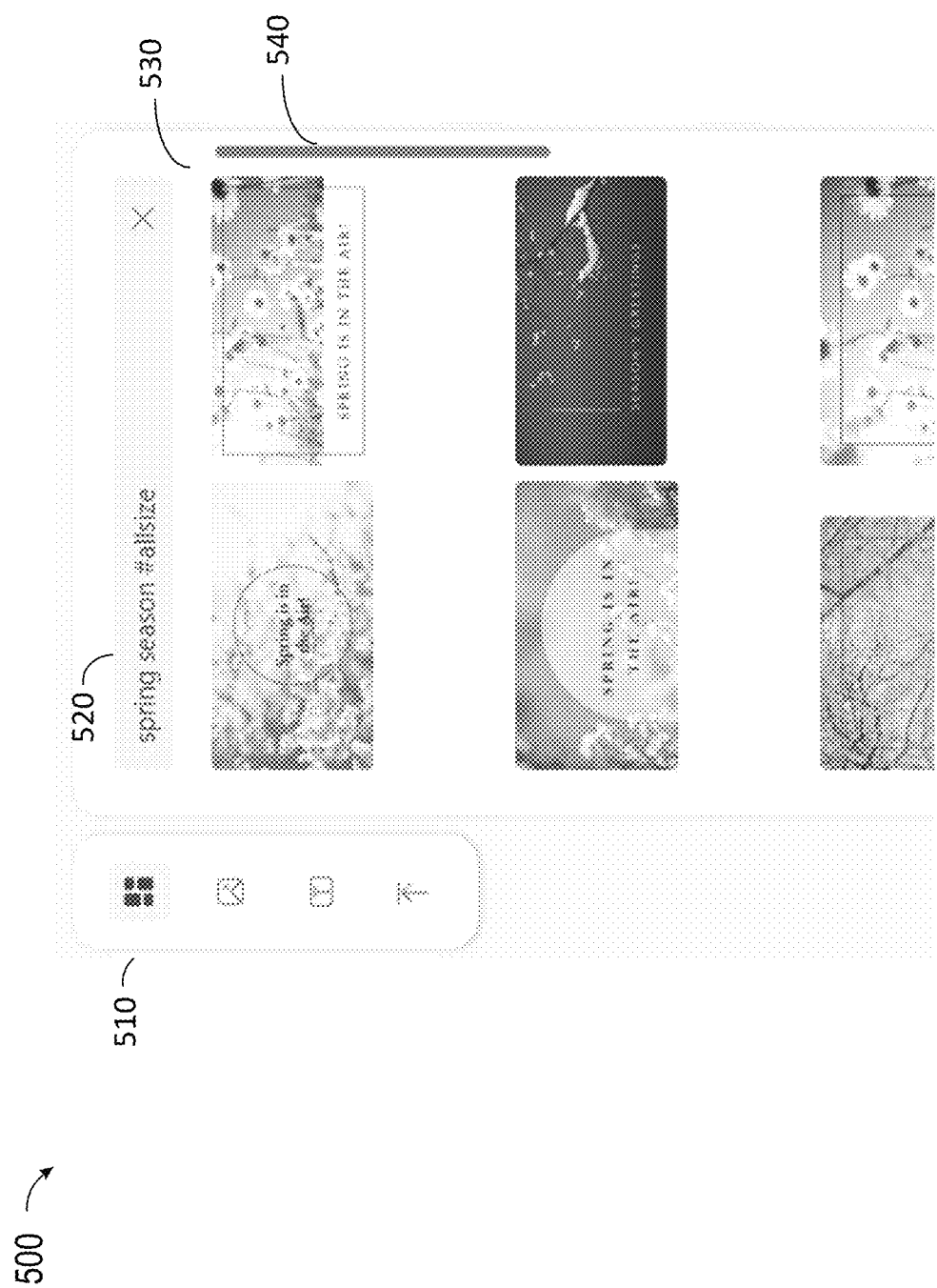
FIG. 5 depicts an example GUI screen of an application or service that provides multimodal content retrieval capabilities.

FIG. 5 depict an example GUI screen 500 of an application or service that provides multimodal content retrieval capabilities. GUI screen 500 displays an example screen of a designer application for designing a document (e.g., a flier, card, presentation slide, marketing material, etc.). GUI screen 500 may include a toolbar menu 510 containing various menu options for performing different tasks in the application. For example, the toolbar menu 310 may provide options for the user to choose the type of document they wish to search for and/or to choose the type of input query they wish to submit (e.g., text, image, template, or a combination of two or more).

The GUI screen 500 includes a UI element 520 for entering a search query. The UI element 520 may function as a search input box to input a text query for conducting a search of available assets. In other examples, the UI element 520 may offer options for attaching an image, or other type of document as a search query. For example, an icon may be displayed adjacent to or within the UI element 510 that once selected enables the user to attach a document. In some implementations, the UI element 510 allows the user to enter a text segment and attached one or more documents to submit a combination of search query inputs. Furthermore, the UI element 520 may enable the user to enter other requirements into the input box. For example, the user may enter the type of document desired (e.g., images, templates, icons, etc.). In another example, the user can enter the desired size of the search results (e.g., all sizes, large sizes, etc.).

Once the user enters a search query into the input box 520, they may utilize a UI element (not shown) or the enter key on a keyboard to submit the search request. The application may then utilize a local content retrieval engine or transmit a request to a global content retrieval engine to perform a search for the requested assets. The search may be performed, as discussed above, and the search results may be provided to the application.

Once the results are received, the application may display the search results in a screen portion 530 of the GUI screen 500. As depicted, the search results may include multimodal documents (e.g., templates). Other types of assets may also be provided as search results. A scroll bar 540 may be provided for scrolling through the search results when the results cannot be displayed in the available screen space. The search results may be displayed in an order in which they were ranked based on their similarity score. It should be noted that while a UI element 520 is displayed in GUI Screen 500 for entering a search query and the search results are displayed in the screen portion 530, many other type of UI elements may be utilized for these purposes. For example, the search results may be displayed in a pop-menu that appears over the GUI screen 500. The user may select one or more of the displayed search results by clicking on the desired search result. Upon selection, the selected search result may be opened in a content pane for use and editing.

It should be noted that while GUI screen 500 includes a search input box 520, in some implementations, search results are provided automatically as recommendations without an explicit user request.

Figure 6:
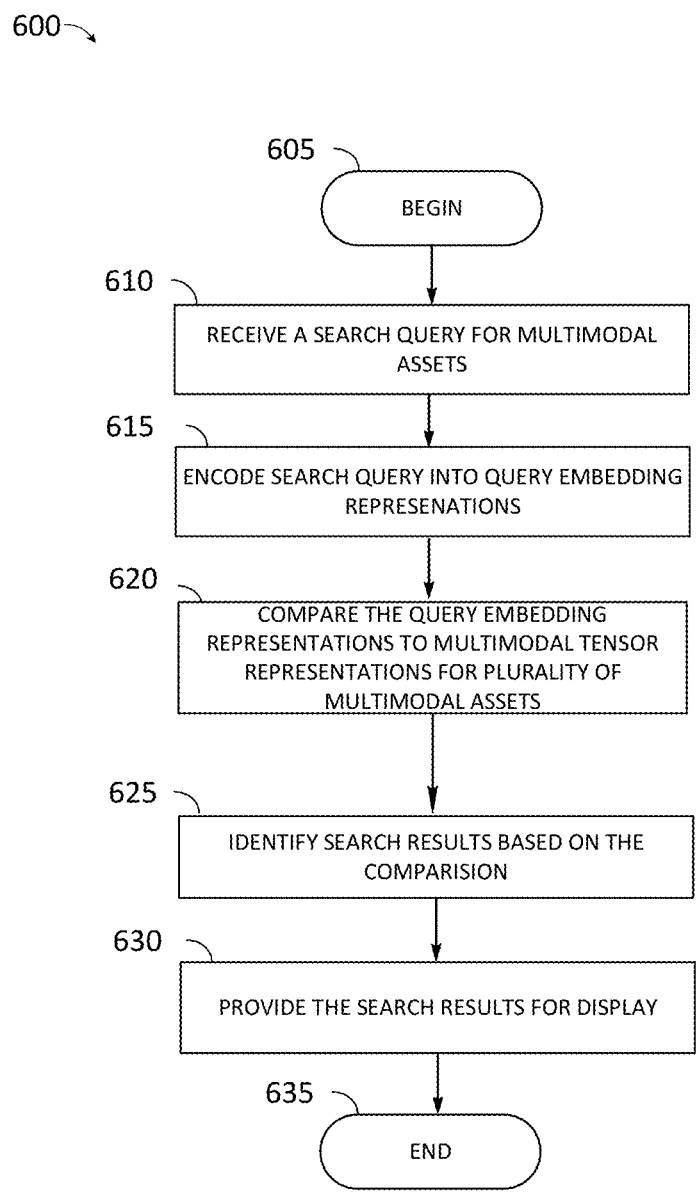
FIG. 6 is a flow diagram depicting an example method for intelligently retrieving assets based on a query.

FIG. 6 is a flow diagram depicting an exemplary method 600 for intelligently retrieving assets based on a query. One or more steps of the method 600 may be performed by a content retrieval engine such as the content retrieval engine 114 of FIGS. 1A-1B or by an application such as applications 112/134 of FIGS. 1A-1B. The method 600 may begin, at 605, and proceed to receive a search query for multimodal assets, at 610. This may occur, for example, when a user submits a search query input via a UI of an application or service that provides asset retrieval. The search query may include one or more keywords, images, templates, or other multimodal documents and may be provided via a client device. The search query may then be transmitted via a network to a content retrieval engine.

Once a search query is received, the data within the search query may be encoded into query embedding representations, at 615. This may be done by utilizing a trained query representation ML model that converts data into embeddings. The embeddings may then be compared to multimodal tensor representations for a plurality of candidate multimodal assets by a matching and ranking unit, at 620. This may involve first retrieving multimodal tensor representations that have previously been generated from candidate multimodal assets. In some implementations, both the query embeddings and the multimodal tensor representations are summarized to generate summarized tensor representations that can be used in an ANN search.

Comparing the summarized query representations with the summarized tensor representations may involve two stages. During a first stage, a smaller set of candidate multimodal assets are selected for comparison. During the second stage, a tensor-to-tensor comparison is performed for every tensor in the query embedding representations and every tensor in the smaller candidate set of multimodal assets. Based on the comparison, a similarity score may be calculated for each of the multimodal assets. One or more of the candidate multimodal assets are then identified as search results, based on the comparison, at 625. In an example, multimodal assets having similarity scores that are higher than a given threshold are selected as the results. The identified search results may then be provided for display to the application from which the search query was received, at 630, before method 600 ends, at 635.

Figure 7:
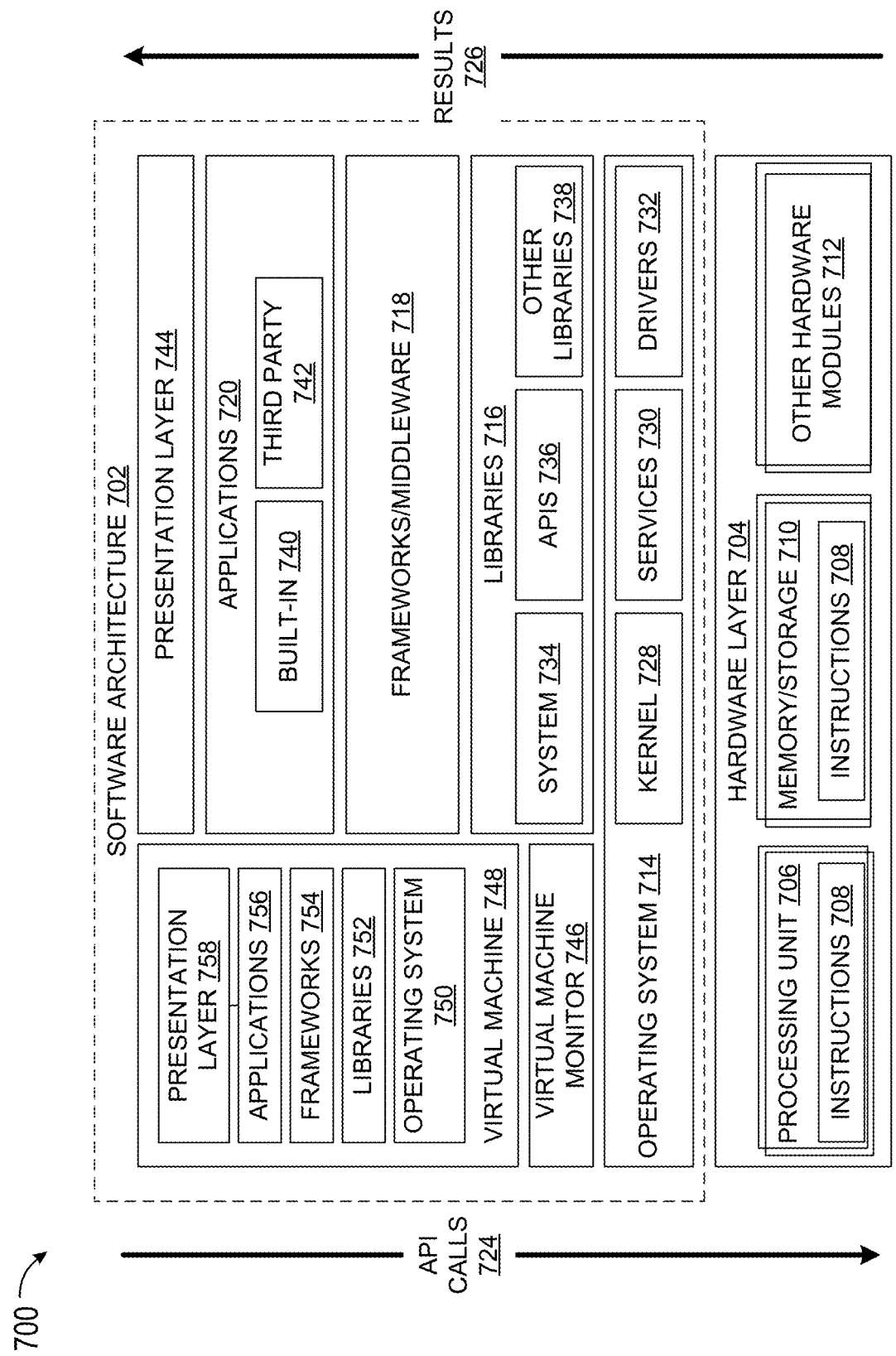
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as client devices, native application provider, web servers, server clusters, external services, and other servers. A representative hardware layer 704 includes a processing unit 706 and associated executable instructions 708. The executable instructions 708 represent executable instructions of the software architecture 702, including implementation of the methods, modules and so forth described herein.

The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular system. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine depicted in block diagram 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
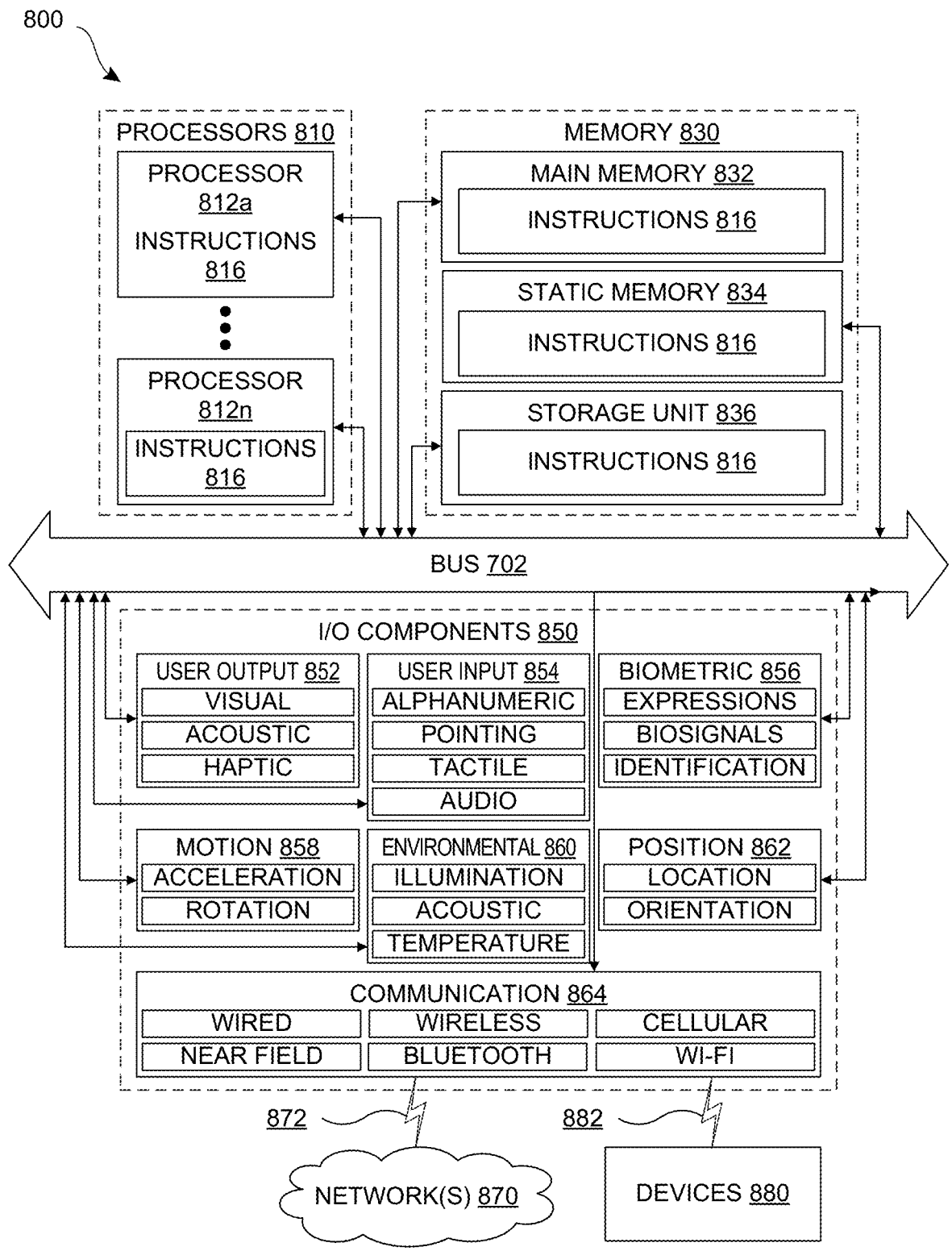
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement methods or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860 and/or position components 862, among a wide array of other environmental sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 862 may include, for example, location sensors (for example, a Global Position System (GPS) receiver), altitude sensors (for example, an air pressure sensor from which altitude may be derived), and/or orientation sensors (for example, magnetometers). The motion components 858 may include, for example, motion sensors such as acceleration and rotation sensors. The environmental components 860 may include, for example, illumination sensors, acoustic sensors and/or temperature sensors.

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
    a processor; and
    a memory in communication with the processor, the memory comprising executable instructions that, when executed by the processor, cause the data processing system to perform functions of:
        receiving a search query for searching for one or more multimodal assets from among a plurality of candidate multimodal assets;
        encoding the search query into one or more query embedding representations via a trained query representation machine-learning (ML) model;
        comparing, via a matching unit, the one or more query embedding representations to a plurality of multimodal tensor representations, each of the plurality of multimodal tensor representations being a representation of one of the plurality of candidate multimodal assets; and
        identifying, based on the comparison, at least one of the plurality of the multimodal candidate assets as a search result for the search query; and
        providing the at least one of the plurality of the multimodal candidate assets for display as the search result.

Item 2. The data processing system of item 1, wherein one or more of the plurality of candidate multimodal assets include a plurality of elements.

Item 3. The data processing system of item 2, wherein the plurality of elements include at least one of an image element, an icon element, a GIF element, an illustration element, and a text element.

Item 4. The data processing system of item 2, wherein a multimodal tensor representation for each one of the plurality of candidate multimodal assets includes an embedding representation for each of the plurality of the elements in each of the plurality of candidate multimodal assets.

Item 5. The data processing system of item 4, wherein the executable instructions, when executed by the processor, further cause the data processing system to perform functions of:
providing the plurality of candidate multimodal assets to a trained asset representation ML model to generate the embedding representation for each of the plurality of elements;
receiving the embedding representation for each of the plurality of elements as an output from the trained asset representation model;
generating the multimodal tensor representation for each one of the plurality of candidate multimodal asserts from the received embedding representations; and
generating a summarized embedding representation for the multimodal tensor representation.

Item 6. The data processing system of item 5, wherein generating a summarized embedding representation for the multimodal tensor representation includes creating one aggregate embedding representation for each different modality in each one of the plurality of candidate multimodal assets.

Item 7. The data processing system of item 5, wherein the executable instructions, when executed by the processor, further cause the data processing system to perform functions of:
generating a query tensor for the one or more query embedding representations;
generating a summarized query embedding representation for the query tensor;
applying an Approximate Nearest Neighbor (ANN) technique to the summarized query embedding representation to generate an indexed query representation; and
applying the ANN technique to the summarized tensor representation for each one of the plurality of candidate assets,
wherein comparing the one or more query embedding representations to a plurality of multimodal tensor representations includes:
 applying an ANN search technique to the summarized tensor representation for each one of the plurality of candidate assets, based on the summarized query embedding representation, to generate a smaller candidate set of multimodal assets from among the plurality of candidate multimodal assets;
 performing a tensor-to-tensor comparison between the query tensor and one or more tensors associated with the smaller candidate set of multimodal assets;
 generating a similarity score between the query tensor and each of the multimodal assets in the smaller candidate set of multimodal assets; and
 identifying the at least one of the plurality of multimodal assets as the search result based on the similarity score.

Item 8. The data processing system of item 5, wherein the summarized embedding representation for the multimodal tensor representation has a fixed size.

Item 9. A method for retrieving one or more multimodal assets comprising:
receiving a search query for searching for one or more multimodal assets from among a plurality of candidate multimodal assets;
encoding the search query into one or more query embedding representations via a trained query representation machine-learning (ML) model;
comparing, via a matching unit, the one or more query embedding representations to a plurality of multimodal tensor representations, each of the plurality of multimodal tensor representations being a representation of one of the plurality of candidate multimodal assets; and
identifying, based on the comparison, at least one of the plurality of the candidate multimodal assets as a search result for the search query; and
providing the at least one of the plurality of the candidate multimodal assets for display as the search result.

Item 10. The method of item 9, wherein one or more of the plurality of candidate multimodal assets include a plurality of elements.

Item 11. The method of item 10, wherein a multimodal tensor representation for each one of the plurality of candidate multimodal assets includes an embedding representation for each of the plurality of the elements in each of the plurality of candidate multimodal assets.

Item 12. The method of item 11, further comprising:
providing the plurality of candidate multimodal assets to a trained asset representation ML model to generate the embedding representation for each of the plurality of elements;
receiving the embedding representation for each of the plurality of elements as an output from the trained asset representation model;
generating the multimodal tensor representation for each one of the plurality of candidate multimodal asserts from the received embedding representations; and
generating a summarized embedding representation for the multimodal tensor representation.

Item 13. The method of item 12, wherein generating a summarized embedding representation for the multimodal tensor representation includes creating one aggregate embedding representation for each different modality in each one of the plurality of candidate multimodal assets.

Item 14. The method of item 12, further comprising:
generating a query tensor for the one or more query embedding representations;
generating a summarized query embedding representation for the query tensor;
applying an Approximate Nearest Neighbor (ANN) technique to the summarized query embedding representation to generate an indexed query representation; and
applying the ANN technique to the summarized tensor representation for each one of the plurality of candidate assets,
wherein comparing the one or more query embedding representations to a plurality of multimodal tensor representations includes:
 applying an ANN search technique to the summarized tensor representation for each one of the plurality of candidate assets, based on the summarized query embedding representation, to generate a smaller candidate set of multimodal assets from among the plurality of candidate multimodal assets;

performing a tensor-to-tensor comparison between the query tensor and one or more tensors associated with the smaller candidate set of multimodal assets;

generating a similarity score between the query tensor and each of the multimodal assets in the smaller candidate set of multimodal assets; and identifying the at least one of the plurality of multimodal assets as the search result based on the similarity score.

Item 15. The method of item 9, wherein the search query includes at least one of a multimodal object having a plurality of elements, a text segment, an image, an icon, and an illustration.

Item 16. A non-transitory computer readable medium on which are stored instructions that, when executed, cause a programmable device to perform functions of:

receiving a search query for searching for one or more multimodal assets from among a plurality of candidate multimodal assets;

encoding the search query into one or more query embedding representations via a trained query representation machine-learning (ML) model;

comparing, via a matching unit, the one or more query embedding representations to a plurality of multimodal tensor representations, each of the plurality of multimodal tensor representations being a representation of one of the plurality of candidate multimodal assets; and identifying, based on the comparison, at least one of the plurality of the candidate multimodal assets as a search result for the search query; and providing the at least one of the plurality of the candidate multimodal assets for display as the search result.

Item 17. The non-transitory computer readable medium of item 16, wherein one or more of the plurality of candidate multimodal assets include a plurality of elements.

Item 18. The non-transitory computer readable medium of item 17, wherein a multimodal tensor representation for each one of the plurality of candidate multimodal assets includes an embedding representation for each of the plurality of the elements in each of the plurality of candidate multimodal assets.

Item 19. The non-transitory computer readable medium of item 18, wherein the instructions when executed, further cause a programmable device to perform functions of:

providing the plurality of candidate multimodal assets to a trained asset representation ML model to generate the embedding representation for each of the plurality of elements;

receiving the embedding representation for each of the plurality of elements as an output from the trained asset representation model;

generating the multimodal tensor representation for each one of the plurality of candidate multimodal asserts from the received embedding representations; and generating a summarized embedding representation for the multimodal tensor representation.

Item 20. The non-transitory computer readable medium of item 19, wherein the instructions when executed, further cause a programmable device to perform functions of:

generating a query tensor for the one or more query embedding representations;

generating a summarized query embedding representation for the query tensor;

applying an Approximate Nearest Neighbor (ANN) technique to the summarized query embedding representation to generate an indexed query representation; and applying the ANN technique to the summarized tensor representation for each one of the plurality of candidate assets, wherein comparing the one or more query embedding representations to a plurality of multimodal tensor representations includes:

applying an ANN search technique to the summarized tensor representation for each one of the plurality of candidate assets, based on the summarized query embedding representation, to generate a smaller candidate set of multimodal assets from among the plurality of candidate multimodal assets;

performing a tensor-to-tensor comparison between the query tensor and one or more tensors associated with the smaller candidate set of multimodal assets;

generating a similarity score between the query tensor and each of the multimodal assets in the smaller candidate set of multimodal assets; and identifying the at least one of the plurality of multimodal assets as the search result based on the similarity score.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions that, when executed by the processor, cause the data processing system to perform:
   receiving, via a query representation model, a search query for searching for one or more multimodal assets from among a plurality of candidate multimodal assets, wherein the one or more multimodal assets and the search query each includes multimodal content containing two or more different types of content including graphic or image content;
   parsing, via the query representation model, the search query including the multimodal content;
   identifying, based on the parsing, a first content type and a second content type in the search query, the second content type being a graphic or image content type;
   transmitting the first content type to a first representation model to generate a first set of vector embeddings;
   transmitting the second content type to a second representation model to generate a second set of vector embeddings;
   transmitting the first and second sets of vector embeddings to a tensor generation unit to generate tensors based on the first and second sets of vector embeddings and to output a query tensor representation;
   comparing, via a matching unit, the query tensor representation to a plurality of multimodal tensor representations, each of the plurality of multimodal tensor representations being a representation of one of the plurality of candidate multimodal assets; and
   identifying, based on the comparing, at least one of the plurality of the candidate multimodal assets as a search result for the search query; and
   providing the at least one of the plurality of the candidate multimodal assets for display as the search result.

2. The data processing system of claim 1, wherein the graphic or image content comprises at least one of an image element, an icon element, a GIF element, and an illustration element.

3. The data processing system of claim 1, wherein the multimodal tensor representation for each one of the plurality of candidate multimodal assets includes a vector embedding representation for each of a plurality of elements in each of the plurality of candidate multimodal assets.

4. The data processing system of claim 3, wherein the executable instructions, when executed by the processor, further cause the data processing system to perform:
   providing the plurality of candidate multimodal assets to a trained asset representation machine-learning (ML) model to generate the vector embedding representation for each of the plurality of elements;
   receiving the vector embedding representation for each of the plurality of elements as an output from the trained asset representation ML model;
   generating the multimodal tensor representation for each one of the plurality of candidate multimodal assets asserts from the received vector embedding representations; and
   generating a summarized embedding representation for the multimodal tensor representation.

5. The data processing system of claim 4, wherein generating the summarized embedding representation for the multimodal tensor representation includes creating one aggregate embedding representation for each different modality in each one of the plurality of candidate multimodal assets.

6. The data processing system of claim 4, wherein the executable instructions, when executed by the processor, further cause the data processing system to perform:
   generating a summarized query embedding representation for the query tensor representation;
   applying an Approximate Nearest Neighbor (ANN) technique to the summarized query embedding representation to generate an indexed query representation; and
   applying the ANN technique to a summarized tensor representation for each one of the plurality of candidate assets,
   wherein comparing the one or more query embedding representations to the plurality of multimodal tensor representations includes:
   applying an ANN search technique to the summarized tensor representation for each one of the plurality of candidate assets, based on the summarized query embedding representation, to generate a smaller candidate set of multimodal assets from among the plurality of candidate multimodal assets;
   performing a tensor-to-tensor comparison between the query tensor and one or more tensors associated with the smaller candidate set of multimodal assets;
   generating a similarity score between the query tensor and each of the multimodal assets in the smaller candidate set of multimodal assets; and
   identifying the at least one of the plurality of multimodal assets as the search result based on the similarity score.

7. The data processing system of claim 4, wherein the summarized embedding representation for the multimodal tensor representation has a fixed size.

8. A method for retrieving one or more multimodal assets comprising:
   receiving, via a query representation model, a search query for searching for the one or more multimodal assets from among a plurality of candidate multimodal assets, wherein the one or more multimodal assets and the search query each includes multimodal content containing two or more different types of content including graphic or image content;

parsing, via the query representation model, the search query including the multimodal content;

identifying, based on the parsing, a first content type and a second content type in the search query, the second content type being a graphic or image content type;

transmitting the first content type to a first representation model to generate a first set of vector embeddings;

transmitting the second content type to a second representation model to generate a second set of vector embeddings;

transmitting the first and second sets of vector embeddings to a tensor generation unit to generate tensors based on the first and second sets of vector embeddings and to output a query tensor representation;

comparing, via a matching unit, the query tensor representation to a plurality of multimodal tensor representations, each of the plurality of multimodal tensor representations being a representation of one of the plurality of candidate multimodal asset; and identifying, based on the comparing, at least one of the plurality of the candidate multimodal assets as a search result for the search query; and providing the at least one of the plurality of the candidate multimodal assets for display as the search result.

9. The method of claim 8, wherein the graphic or image content comprises at least one of an image element, an icon element, a GIF element, and an illustration element.

10. The method of claim 8, wherein a multimodal tensor representation for each one of the plurality of candidate multimodal assets includes a vector embedding representation for each of a plurality of elements in each of the plurality of candidate multimodal assets.

11. The method of claim 10, further comprising:
providing the plurality of candidate multimodal assets to a trained asset representation machine-learning (ML) model to generate the vector embedding representation for each of the plurality of elements;
receiving the vector embedding representation for each of the plurality of elements as an output from the trained asset representation ML model;
generating the multimodal tensor representation for each one of the plurality of candidate multimodal assets from the received vector embedding representations; and
generating a summarized embedding representation for the multimodal tensor representation.

12. The method of claim 11, wherein generating the summarized embedding representation for the multimodal tensor representation includes creating one aggregate embedding representation for each different modality in each one of the plurality of candidate multimodal assets.

13. The method of claim 11, further comprising:
generating a summarized query embedding representation for the query tensor representation;
applying an Approximate Nearest Neighbor (ANN) technique to the summarized query embedding representation to generate an indexed query representation; and
applying the ANN technique to a summarized tensor representation for each one of the plurality of candidate assets,
wherein comparing the one or more query embedding representations to the plurality of multimodal tensor representations includes:

applying an ANN search technique to the summarized tensor representation for each one of the plurality of candidate assets, based on the summarized query embedding representation, to generate a smaller candidate set of multimodal assets from among the plurality of candidate multimodal assets;

performing a tensor-to-tensor comparison between the query tensor and one or more tensors associated with the smaller candidate set of multimodal assets;

generating a similarity score between the query tensor and each of the multimodal assets in the smaller candidate set of multimodal assets; and identifying the at least one of the plurality of multimodal assets as the search result based on the similarity score.

14. The method of claim 11, wherein the summarized embedding representation for the multimodal tensor representation has a fixed size.

15. A non-transitory computer readable medium on which are stored instructions that, when executed, cause a programmable device to perform:
receiving, via a query representation model, a search query for searching for one or more multimodal assets from among a plurality of candidate multimodal assets, wherein the one or more multimodal asset and the search query each includes multimodal content containing two or more different types of content including graphic or image content;
parsing, via the query representation model, the search query including the multimodal content;
identifying, based on the parsing, a first content type and a second content type in the search query, the second content type being a graphic or image content type;
transmitting the first content type to a first representation model to generate a first set of vector embeddings;
transmitting the second content type to a second representation model to generate a second set of vector embeddings;
transmitting the first and second sets of vector embeddings to a tensor generation unit to generate tensors based on the first and second sets of vector embeddings and to output a query tensor representation;
comparing, via a matching unit, the query tensor representation to a plurality of multimodal tensor representations, each of the plurality of multimodal tensor representations being a representation of one of the plurality of candidate multimodal asset; and
identifying, based on the comparing, at least one of the plurality of the candidate multimodal assets as a search result for the search query; and
providing the at least one of the plurality of the candidate multimodal assets for display as the search result.

16. The non-transitory computer readable medium of claim 15, wherein the graphic or image content comprises at least one of an image element, an icon element, a GIF element, and an illustration element.

17. The non-transitory computer readable medium of claim 15, wherein a multimodal tensor representation for each one of the plurality of candidate multimodal assets includes a vector embedding representation for each of a plurality of elements in each of the plurality of candidate multimodal assets.

18. The non-transitory computer readable medium of claim 17, further comprising instructions for:
providing the plurality of candidate multimodal assets to a trained asset representation machine-learning (ML) model to generate the vector embedding representation for each of the plurality of elements;

receiving the vector embedding representation for each of the plurality of elements as an output from the trained asset representation ML model;

generating the multimodal tensor representation for each one of the plurality of candidate multimodal assets from the received vector embedding representations; and generating a summarized embedding representation for the multimodal tensor representation.

19. The non-transitory computer readable medium of claim 18, wherein generating the summarized embedding representation for the multimodal tensor representation includes creating one aggregate embedding representation for each different modality in each one of the plurality of candidate multimodal assets.

20. The non-transitory computer readable medium of claim 18, further comprising:

generating a summarized query embedding representation for the query tensor representation;

applying an Approximate Nearest Neighbor (ANN) technique to the summarized query embedding representation to generate an indexed query representation; and applying the ANN technique to a summarized tensor representation for each one of the plurality of candidate assets, wherein comparing the one or more query embedding representations to the plurality of multimodal tensor representations includes:

applying an ANN search technique to the summarized tensor representation for each one of the plurality of candidate assets, based on the summarized query embedding representation, to generate a smaller candidate set of multimodal assets from among the plurality of candidate multimodal assets;

performing a tensor-to-tensor comparison between the query tensor and one or more tensors associated with the smaller candidate set of multimodal assets;

generating a similarity score between the query tensor and each of the multimodal assets in the smaller candidate set of multimodal assets; and identifying the at least one of the plurality of multimodal assets as the search result based on the similarity score.

21. The non-transitory computer readable medium of claim 18, wherein the summarized embedding representation for the multimodal tensor representation has a fixed size.

* * * * *